United States Patent
Nakagawa et al.

(10) Patent No.: US 9,817,233 B2
(45) Date of Patent: Nov. 14, 2017

(54) IMAGE DISPLAY DEVICE

(71) Applicant: MITSUBISHI ELECTRIC CORPORATION, Tokyo (JP)

(72) Inventors: Nozomi Nakagawa, Tokyo (JP); Hironori Nakahara, Tokyo (JP); Tomo Kishigami, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/508,436

(22) PCT Filed: Aug. 25, 2015

(86) PCT No.: PCT/JP2015/073812
§ 371 (c)(1),
(2) Date: Mar. 2, 2017

(87) PCT Pub. No.: WO2016/035607
PCT Pub. Date: Mar. 10, 2016

(65) Prior Publication Data
US 2017/0285341 A1 Oct. 5, 2017

(30) Foreign Application Priority Data
Sep. 3, 2014 (JP) ................................. 2014-179264

(51) Int. Cl.
G02B 26/08 (2006.01)
G02B 27/01 (2006.01)
G02B 3/00 (2006.01)

(52) U.S. Cl.
CPC ....... *G02B 27/0101* (2013.01); *G02B 3/0056* (2013.01); *G02B 27/0149* (2013.01);
(Continued)

(58) Field of Classification Search
CPC .............. G02B 27/0101; G02B 3/0056; G02B 27/0149; G02B 2027/0114;
(Continued)

(56) References Cited

U.S. PATENT DOCUMENTS 5,119,235 A 6/1992 Umeda et al.
8,675,283 B2 3/2014 Fujikawa et al.
(Continued)

FOREIGN PATENT DOCUMENTS

JP 2881877 B2 4/1999
JP 2003-149596 A 5/2003
(Continued)

OTHER PUBLICATIONS

Office Action dated Mar. 7, 2017, for counterpart Japan Application No. 2016-546565, 6 pages.*

*Primary Examiner* — James Phan
(74) *Attorney, Agent, or Firm* — Birch, Stewart, Kolasch & Birch, LLP

(57) ABSTRACT

The image display device (100) provides images perceivable from the area of the eye box (E), and includes a light source unit (110), a screen (140), a scanning unit (130) and an optical system (155). The screen (140) has a single micro lens array (1) on which multiple micro lenses (3) are arranged. The scanning unit (130) includes a mirror (130*a*) to reflect beams emitted from the light source unit (110), and swings the mirror (130*a*) around a pivot center (130*c*) to scan the beams thereover, thereby generating images. The optical system (155) brings the images formed on the screen (140) to the eye box (E). An angle ($\theta_{out}$) formed between a zero-order diffracted beam and a first-order diffracted beam, which are among a luminous flux of beams diffracted by the screen (140) and pass through the center of the eye box (E), is smaller than a minimum visual angle ($V_{min}$).

20 Claims, 16 Drawing Sheets

(52) U.S. Cl.
CPC .......... *G02B 2027/0114* (2013.01); *G02B 2027/0118* (2013.01); *G02B 2027/0145* (2013.01); *G02B 2027/0154* (2013.01)

(58) Field of Classification Search
CPC .... G02B 2027/0118; G02B 2027/0145; G02B 2027/0154; G02B 26/0833; G02B 26/0875; G02B 26/101
USPC ...... 359/205.1, 208.1–208.2, 619; 345/7, 32, 345/84; 353/34, 50
See application file for complete search history.

(56) References Cited

U.S. PATENT DOCUMENTS

2015/0293271 A1    10/2015  Miyasaka et al.
2017/0068091 A1*    3/2017  Greenberg .............. G06F 3/013

FOREIGN PATENT DOCUMENTS

| JP | 2004-333853 A | 11/2004 |
|----|---------------|---------|
| JP | 2005-128351 A | 5/2005 |
| JP | 2006-189676 A | 7/2006 |
| JP | 2007-108400 A | 4/2007 |
| JP | 2012-226304 A | 11/2012 |
| JP | 2013-3447 A   | 1/2013 |
| JP | 2013-64985 A  | 4/2013 |
| JP | 2014-38314 A  | 2/2014 |
| JP | 2014-149405 A | 8/2014 |
| WO | WO 2014/104106 A1 | 7/2014 |

* cited by examiner

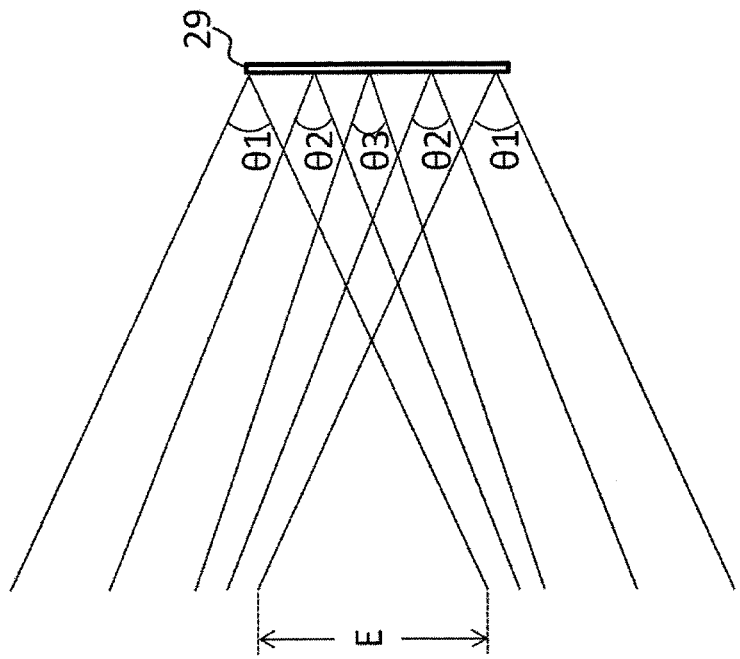
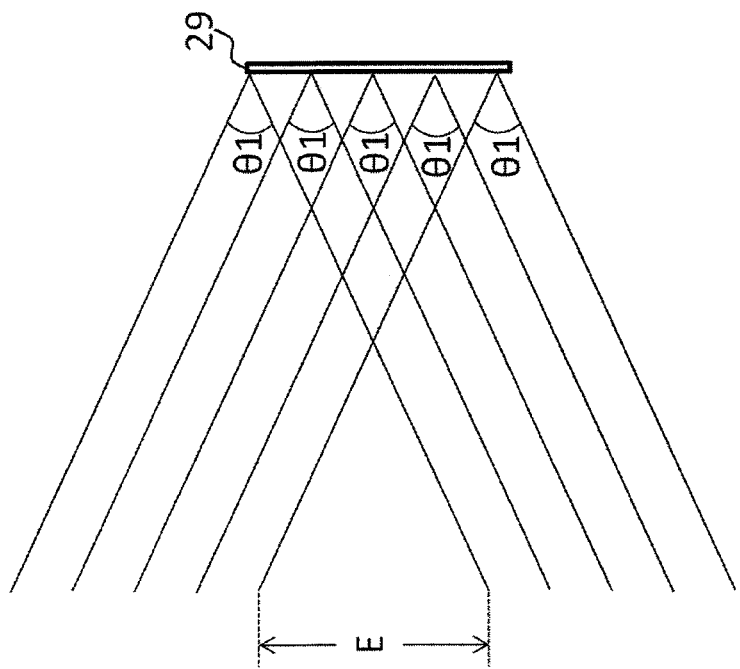

IMAGE DISPLAY DEVICE

TECHNICAL FIELD

The present invention relates to an image display device having a micro lens array as a screen for displaying an image.

BACKGROUND ART

A head-up display generates an image on a screen, for example, with a MEMS mirror. The image generated on the screen is emerging as image beams. The image beams are reflected by a reflection mirror etc. called a combiner, then magnified by a magnifying device etc., and finally are guided to the eye position or the eye point of the driver. The image generated on the screen is perceived from the eye point as a virtual image.

There is a conventional technique proposed for a head-up display screen to use a micro lens array, which is composed of a large number of lenses periodically arranged. However, in a case where a sheet of the micro lens array is applied to a screen, the periodic structure of the micro lens array causes diffracted beams, resulting in a problem of luminance unevenness.

Patent Document 1 therefore discloses a technique for using two sheets of micro lens arrays, that is to say a first micro lens array unit and a second micro lens array unit. The two micro lens arrays are oppositely arranged and spaced from each other by a distance longer than the focal distance of the micro lens array disposed in the first micro lens array unit. Also, the intervals between the micro lenses disposed in the first micro lens array unit are configured to be narrower than those in the second micro lens array unit. This prevents excessively bright spots from being generated. Namely, by using the two micro lens arrays, generation of the diffracted beams resulting from the periodic arrangement of the micro lens arrays can be prevented.

PRIOR ART DOCUMENT

Patent Document

Patent Document 1
Japanese Patent Laid-Open Publication No. 2012-226304 (pages from 13 to 16, FIG. 3)

SUMMARY OF THE INVENTION

Problem to be Solved by the Invention

Usage of two micro lens arrays, however, reduces the light transmissibility, lowering the light utilization efficiency. Also increased assembly complexity due to usage of two micro lens arrays lowers productivity and makes the manufacturing cost higher.

The present invention is made to solve the problems above. According to the proposed technique, brightness of the excessively bright spots can be lowered using a single sheet of micro lens array. Namely, the technique can make the excessively bright spots less perceivable.

Means for Solving the Problem

An image display device to provide an image perceivable from an area of an eye box, according to the present invention, includes a light source unit to emit a beam, a screen having a micro lens array on which multiple micro lenses are arranged, a scanning unit that has a mirror to reflect the beams emitted from the light source unit, and that swings the mirror around a pivot center to scan the beams over the screen, thereby generating the image on the screen, and an optical system to bring the image formed on the screen to the eye box, wherein an angle formed between a zero-order diffracted beam and a first-order diffracted beam, which are among a luminous flux of beams diffracted by the screen and pass through the eye box center, is smaller than a minimum visual angle.

Effect of the Invention

An image display device according to the present invention can make bright spots less perceivable using only a single sheet of micro lens array.

BRIEF DESCRIPTION OF FIGURES

FIG. 16A are diagrams for illustrating characteristics of the micro lens array according to Embodiment 4 of the present invention.

FIG. 16B are diagrams for illustrating characteristics of the micro lens array according to Embodiment 4 of the present invention.

EMBODIMENTS FOR CARRYING OUT THE INVENTION

Up to now, several techniques have been proposed to apply a micro lens array to a head-up display.

A micro lens array is an optical device composed of a large number of micro lenses periodically arranged. The micro lens array is an optical device to generate an intermediate image of the image viewed by a driver, and to enlarge the area from which the driver can view the displayed image. The micro lens array, when used for a head-up display, functions as a screen to which image beams are projected. The "image beams" here mean beams carrying image information.

The micro lens array used as a screen for a head-up display requires a large screen size, which means that the micro lens array needs a large number of micro lenses.

For example, a 75 [mm]×25 [mm] sized screen needs 1,350,000 micro lenses disposed on it. Here, it is assumed that the micro lenses on the screen are arranged in a honeycomb structure, in which the interval between micro lenses, or the repetition period thereof, is 40 [μm].

A micro lens array is disclosed as a conventional technique in which micro lenses are randomly arranged with their apexes being displaced under a certain condition. An example is described in the paragraph 0021 of Japanese Patent Laid-Open Publication No. 2007-108400.

According to the method described in Patent Document 1, however, a micro lens array of a larger size requires arrangement settings for a large number of micro lenses, which leads to an enormous amount of screen designing data.

According to the technique disclosed in the present invention, this problem can be solved; that is, micro lens arrays can be designed with a reduced amount of design data than conventional techniques.

As the result, image display devices having a micro lens array functioning as their screen can also be designed with a reduced amount of design data than conventional techniques.

A screen configured with two micro lens arrays, as described in Patent Document 1, has a problem in that the screen configured therewith makes conspicuous dot-like pixels on the displayed image, due to luminance unevenness. The technique according to the present invention can reduce the conspicuousness of the dot-like pixels on the displayed image due to the luminance unevenness.

Embodiment 1

<Configuration of Micro Lens Array 1>

Figure 1:
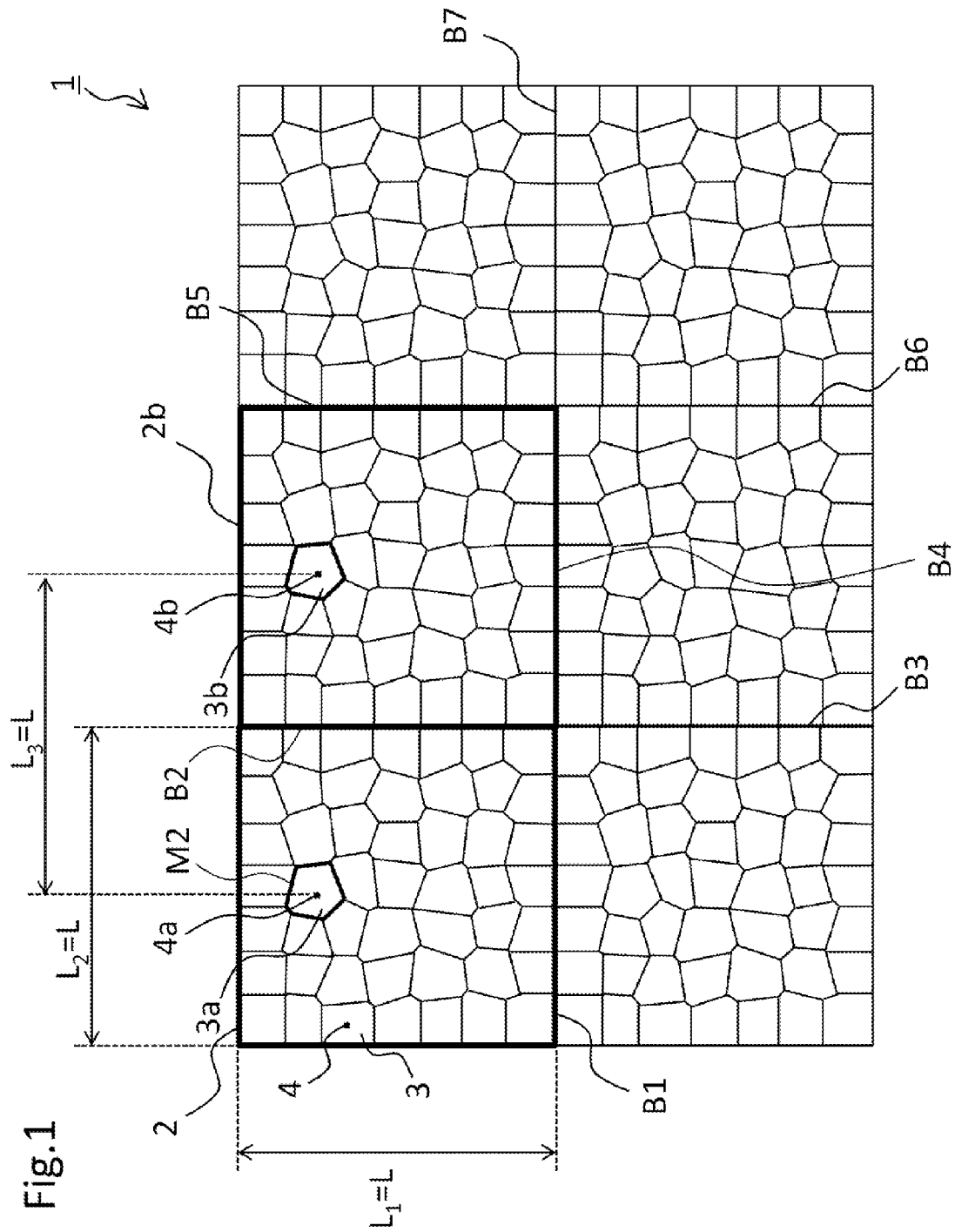
FIG. 1 is a drawing illustrating a micro lens array according to Embodiment 1 of the present invention.

FIG. 1 is a drawing illustrating a micro lens array 1 according to Embodiment 1 of the present invention. As shown in FIG. 1 with bold rectangular frames, the micro lens array 1 includes multiple basic pattern lens groups 2.

The shape of the basic pattern lens group 2 is, for example, a rectangular with the longitudinal length $L_1$ and the lateral length $L_2$. FIG. 1 shows a case where the shape of the basic pattern lens group 2 is a square where $L_1=L_2=L$.

The micro lens array 1 shown in FIG. 1 has a configuration in which two basic pattern lens groups are longitudinally arranged and three basic pattern lens groups are laterally arranged. That is to say, in the micro lens array 1 shown in FIG. 1, the basic pattern lens groups 2 are arranged in 2×3.

The basic pattern lens group 2 are arranged adjoining to each other across the dividing lines B1 to B7. That is to say, the arrangement pattern according to which the micro lenses 3 in a basic pattern lens group 2 are positioned is repeatedly applied to every micro lens 3 of the micro lens array 1. Each of the dividing lines B1 to B7 is categorized as a first dividing line.

Such expression as "B1 to B7", as used above, hereinafter means "B1, B2, B3, B4, B5, B6 and B7". The expression has to be read as such, regardless of the inside of the quotation marks.

Each of the dividing lines B1 to B7 includes a straight line. Each of the dividing lines B1 to B7 is simply depicted as a straight line in FIG. 1.

FIG. 1 shows only a part of the micro lens array 1. An actual micro lens array 1 has more than 6 of the same basic pattern lens group 2 repeatedly arranged in the longitudinal and the lateral directions.

In the area of a single basic pattern lens group 2, multiple micro lenses 3 are arranged. The dividing lines of each micro lens 3 form, for example, a polygon.

The dot in the micro lens 3 is the apex 4 of the micro lens 3. Each micro lens 3 arranged in the micro lens array 1 has an apex 4. But, for simplicity, FIG. 1 shows the positions of the apexes 4 for only a part of the micro lenses 3.

The apex 4 is the highest projected position on the surface of the micro lens 3 from the surface base of the micro lens array 1. The surface base, for example, is a base on which the multiple micro lenses 3 are arranged. In other words, the multiple micro lenses 3 are arranged on the surface base to form the micro lens array 1.

Here, a repetition period L[mm] of the basic pattern lens group 2 according to Embodiment 1 will be explained.

The repetition period L[mm] is a minimum unit of the repetition structures included within the micro lens array 1, which corresponds to the length of a side of the basic pattern lens group 2 in FIG. 1. Because the basic pattern lens group 2 in FIG. 1 is a square, both L1 and L2 are the same length L. If the basic pattern lens group 2 is a rectangle, the repetition periods are L1 [mm] in longitudinal direction and L2 [mm] in lateral direction.

Attention is to be payed, in FIG. 1, to the basic pattern lens group 2 and a basic pattern lens group 2b adjoining to the right of the basic pattern lens group 2. The symbol 2b is added for distinction, while the basic pattern lens group 2b is of the same configuration as the basic pattern lens group 2.

A micro lens 3a included in the basic pattern lens group 2 and a micro lens 3b included in the basic pattern lens group 2b are respectively arranged at the corresponding positions in the basic pattern lens group 2 and 2b. In FIG. 1, the micro lenses 3a and 3b are marked with bold lines.

The distance $L_3$ between the apex 4a of the micro lens 3a and the apex 4b of the micro lens 3b is equal to the repetition period L[mm] ($L_3=L$).

FIG. 1 here shows square-shaped basic pattern lens group 2 divided by straight dividing lines B1 to B7. The shape, however, may be a rectangular or may have curved segments. The number of basic pattern lens group 2 to be arranged may be changed with consideration of the size of a screen used in a head-up display and/or the screen's optical characteristics explained later.

<Random Arrangement of the Micro Lenses 3>

Next, an arrangement method of the micro lenses 3 on the basic pattern lens groups 2 shown in FIG. 1 will be explained in detail.

Figure 2:
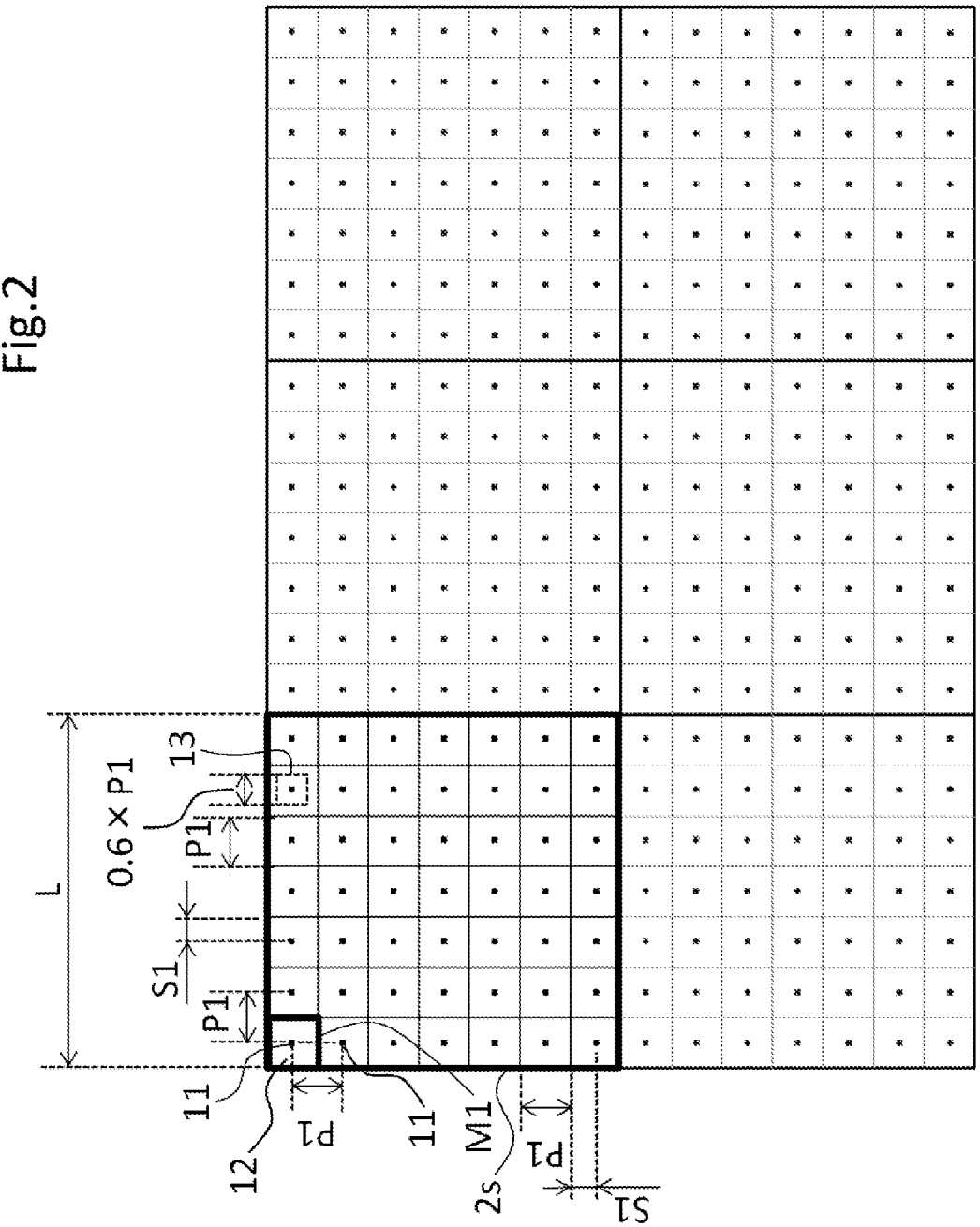
FIG. 2 is a drawing illustrating a primitive lattice used for designing a micro lens array according to Embodiment 1 of the present invention.

FIG. 2 is a drawing for illustrating a primitive lattice to be referenced in positioning the apexes 4 of the micro lenses 3. The micro lenses 3 are included in the micro lens array 1 according to Embodiment 1 of the present invention.

The primitive lattice used in the micro lens array 1 according to Embodiment 1 is a square lattice 10. To be more specific, the micro lens array 1 shown in FIG. 1 is formed by performing transformation (explained later) on the basis of the square lattice 10 (the primitive lattice) shown in FIG. 2. "Lattice" here means periodically arranged segments, or lattice cells.

The apexes 4 of the multiple micro lenses 3 included in the micro lens array 1 are positioned at the positions randomly displaced from lattice cell points 11 of the square lattice cells.

As shown in FIG. 2, the square lattice 10 according to Embodiment 1 is divided into square-shaped lattice cells each of which has a side length of P1. Each of the lattice cells corresponds to a unit pattern area 12, which will be explained later. Each of the lattice cell points 11 is positioned at the center of the corresponding lattice cell. In FIG. 2, each lattice cell is square-shaped.

Each square-shaped lattice cell has, in its inside, a single micro lens 3. A unit pattern area 12 (lattice cell) corresponds to the single micro lens 3. The lattice cell point 11 corresponds to the apex 4 of the micro lens 3.

The primitive lattice has multiple lattice cell points 11 which are periodically positioned the distance P1 apart both in longitudinal and lateral directions. But, for simplicity in FIG. 2, symbols are put for only two lattice cell points among multiple lattice cell points 11.

The unit pattern area 12 according to Embodiment 1 will be explained here.

Each of the unit pattern areas 12 is an area with a single lattice cell point 11 (apex 4), which is shown as a bold-bordered square smaller than the basic pattern lens group 2s in FIG. 2. The unit pattern areas 12 are segmented by dividing lines M1 each of which is a bisector of a line segment linking two lattice cell points 11 adjacent to each other. Thus, the dividing lines M1 are boundary lines between the unit pattern areas 12.

When the primitive lattice is a squarer lattice 10, the unit pattern areas 12 are square-shaped areas as shown in FIG. 2. The basic pattern lens group 2s of the square lattice 10 shown in FIG. 2, corresponding to the basic pattern lens group 2 of the micro lens array 1, includes 7 unit pattern areas 12 in both longitudinal and lateral directions. Thus, one single basic pattern lens group 2s has 49 unit pattern areas 12.

In Embodiment 1, the primitive lattice is assumed to be a square lattice for explanation. A square lattice is a lattice in which the distances between adjacent lattice cell points 11 are equal to each other in both longitudinal and lateral directions. The array periods of the lattice cell points 11, however, may be different between directions, or the longitudinal and lateral directions.

Next, how to randomly position the apexes 4 of the micro lenses 3, with reference to the lattice cell points 11 of the square lattice 10 shown in FIG. 2, will be explained.

In FIG. 2, an area which expands from the lattice cell point 11 toward the dividing lines of the unit pattern area 12 to be partitioned at a predetermined distance is defined as a displacement area 13. The displacement area 13 is set, for example, on the basis of the distance (a half of P1) between the lattice cell point 11 of the square lattice 10 and the dividing line M1 (categorized as a second dividing line) of the unit pattern area 12.

The apex 4 of the micro lens 3 is arranged in a position different from the lattice cell point 11 within the displacement area 13. Namely, within the displacement areas 13, the apexes 4 are displaced from the respective lattice cell points 11 by predetermined displacement amounts differing from one another.

Let the distance between the lattice cell point 11 and the dividing line M1 of the unit pattern area 12 be a reference distance S1. The reference distance S1 is the length of a perpendicular line drawn from the lattice cell point 11 to the dividing line M1 of the unit pattern area 12. The square indicated with dotted lines, shown for example, has sides each of which passes through a point located on the perpendicular line and at 0.6×S1 distance away from the lattice cell point 11, and runs parallel to the dividing lines M1 of the unit pattern area 12.

In FIG. 2, the inside of the square indicated with dotted lines is the displacement area 13. In other words, a lattice whose primitive lattice is a square lattice 10 has square-shaped displacement areas 13 with the centers at the lattice cell points 11 and with the sides of length, for example, 0.6×P1. Here, the distance P1 is twice as long as the reference distance S1.

The displacement area 13 is, as described above, defined by a predetermined distance from the lattice cell point 11. In the above example, the displacement area 13 is formed as a square with the sides of the straight lines passing through the points located at a distance of 0.6×S1 from the lattice cell point 11.

However, it is preferable that the displacement area 13 is smaller than a square with the sides of the straight lines passing through the points located at a distance of 0.9×S1 from the lattice cell point 11. Then, the displacement areas 13 are squares with the centers at the lattice cell points 11 and the sides of length 0.9×P1.

By making the displacement area 13 smaller than the unit pattern area 12, the apexes 4 of the adjoining micro lenses 3 can be prevented from overlapping each other. By making the displacement amounts of the apexes 4 of the micro lenses 3 within the boundary (the dividing lines M1) of the unit pattern areas 12, the apexes 4 of the adjoining micro lenses 3 can be prevented from overlapping each other.

Figure 3:
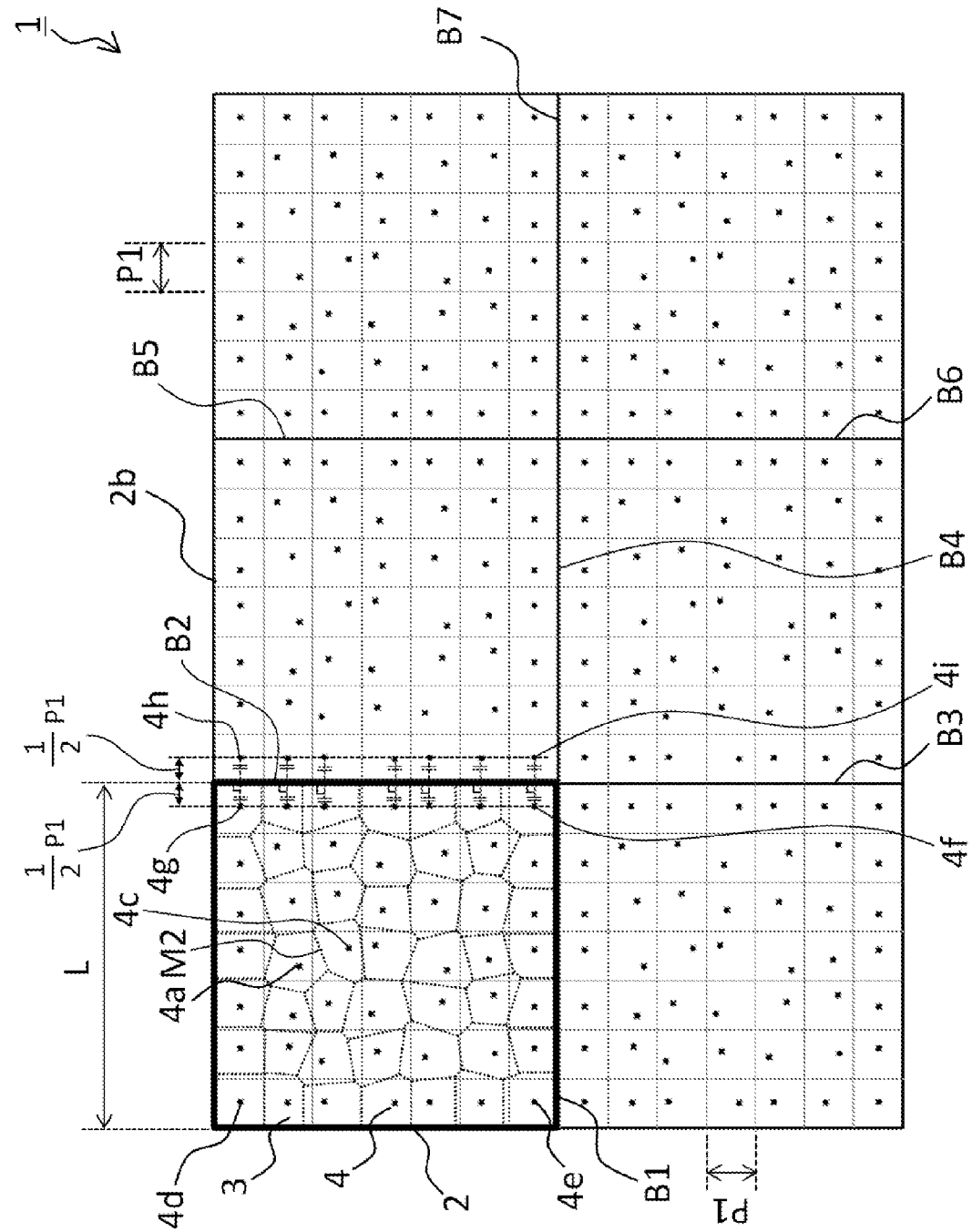
FIG. 3 is a drawing illustrating displacement of apexes of the micro lens array according to Embodiment 1 of the present invention.

FIG. 3 is a diagram in which the apexes 4 of the micro lenses 3 are displaced from the positions of the lattice cell points 11 of the square lattice 10 shown in FIG. 2. The apexes 4 are displaced within the displacement areas 13.

The positions of the apexes 4 of the micro lenses 3 shown in FIG. 3 are determined so that the distribution of displacement amounts of the apexes 4 of all the micro lenses 4 will be equalized in the entire micro lens array 1. To be more specific, for example, the displacement amounts of the apexes 4 of the respective micro lenses 3 are expressed in vector form, and then the positions of the apexes 4 of the micro lenses 3 are determined so that the vector sum of all the displacement amounts of the apexes 4 of the micro lenses 3 will be zero.

In the basic pattern lens group 2, shown as the bold-bordered square in the upper left of the FIG. 3, the dividing lines M2 segmenting the adjoining micro lenses 3 are illustrated with dotted lines. The basic pattern lens group 2 arranged other than in the upper left of the FIG. 3 also have the dividing lines segmenting the adjoining micro lenses 3, which however are omitted in FIG. 3.

First, as shown in FIG. 3, the apexes 4 of the micro lenses 3 are randomly positioned. Then, the dividing lines M2 between the micro lenses 3 adjoining to each other in the basic pattern lens group 2 are determined.

In order to determine the dividing line M2 of the two adjoining micro lenses 3, the dividing line is defined so as to include a line perpendicularly passing through the point which internally divides, in a certain proportion, the line segment linking the two apexes 4 of the adjoining micro lenses 3. In other words, the dividing line M2 includes the perpendicular bisector of the line segment linking the apexes 4 of the adjoining micro lenses 3.

Here, the multiple apexes 4 are randomly positioned. For example, the dotted dividing lines M2 of the micro lenses 3 in FIG. 3 can be obtained by drawing a Voronoi diagram in which equidistant points from each of the apexes 4 are depicted as the boundaries. Here, the apexes 4 correspond to seeds in the Voronoi diagram.

A "Voronoi diagram" is a diagram in which the region is segmented to illustrate which seed, each point existing in the same plane or space is close to, among the arbitrarily positioned multiple seeds. An example shown in FIG. 3 is the dividing line M2 which is a dividing line drawn between the apex 4c and the apex 4a. When assuming that the apex 4a and the apex 4c are seeds, the dividing line M2 is part of the bisector of the line segment linking the apex 4a and the apex 4c.

The basic pattern lens group 2 in the micro lens array 1 according to Embodiment 1 are repeatedly arranged across the dividing lines B1 to B7, each of which includes, as above mentioned, a straight line. However, in FIG. 3, each of the dividing lines B1 to B7 is formed as a straight line.

In order to realize this, the positioning of the apexes 4 of the micro lenses 3 included in the basic pattern lens group 2 must be devised. More specifically, the apexes 4 of the micro lenses 3 adjacent to each other across the dividing lines B1 to B7 are positioned so as to be equidistant from and line-symmetric across the dividing lines B1 to B7.

With this devised positioning, the dividing lines B1 to B7 can be formed as straight lines with a Voronoi diagram, which enables the basic pattern lens group 2 to be arranged adjoining to each other without space. Thus, the dividing lines B1 to B7 segment the adjoining basic pattern lens groups 2.

The devised technique for positioning the apexes 4 will be explained using FIG. 3.

The basic pattern lens group 2 in the upper left of FIG. 3 is assumed to be a square.

First, the apexes 4d to 4g positioned in four corners of this basic pattern lens group 2 are not displaced from the lattice cell points 11 of the square lattice 10. Namely, the displacement amounts of the apexes 4d to 4g are zero.

Next, the apexes 4 of the micro lenses 3 in contact with the dividing line B2 (categorized as a first dividing line) are all equidistant from the dividing line B2. Namely, in the multiple micro lenses 3 in contact with the diving line B2, the distances from the apexes 4 to the dividing line B2 are the same. The lengths of perpendicular lines drawn from the apexes 4 down to the dividing line B2 are the same.

The apexes 4 of the micro lenses 3 adjoining to each other across the dividing line B2 are line-symmetric. To be more specific, in FIG. 3, the apex 4 of the micro lens 3 in the left side of the dividing line B2 and the apex 4 of the micro lens 3 in the right side of the dividing line B2 are positioned line-symmetrically across the dividing line B2. The positions of the apexes 4 of the micro lenses 4 adjoining to each other across the dividing line B2 are displaced from the lattice cell points 11 in the same direction parallel to the dividing line B2.

The apexes 4 of the micro lenses 3 adjoining to each other across the dividing lines other than the dividing line B2, or the dividing lines B3, B5 and B6, are also positioned in the same way, thus the explanation therefor is omitted. The dividing lines B3, B5 and B6 shown in FIG. 3 are dividing lines extending in the longitudinal direction similarly to the dividing line B2.

The apexes 4 of the micro lenses 3 also adjoining to each other across the dividing lines B1, B4 and B7 are positioned in the same manner, thus the detailed explanation is omitted. The dividing lines B1, B4 and B7 shown in FIG. 3 different from the dividing line B2 are dividing lines extending in the lateral direction. In FIG. 3, therefore, the apexes 4 of the micro lenses 3 in the upper sides of the dividing line B1, B4 and B7, and those in the lower side are positioned line-symmetrically across the dividing lines B1, B4 and B7.

In FIG. 3, the apexes 4 of the micro lenses 3 adjoining to each other across the dividing lines B1 to B7 are a distance of a half of P1 away from the dividing lines B1 to B7. Here, P1 is, as mentioned above, the distance between the lattice cell points 11 of the basic square lattice 10.

The micro lens array 1 according to Embodiment 1 can reduce the design data than conventional techniques.

The micro lens array 1 according to Embodiment 1 satisfies the following requirements (1) to (4):
(1) To have multiple micro lenses 3;
(2) To have same multiple basic pattern lens group 2 including first dividing lines B1 to B7;
(3) Each of the basic pattern lens group 2 of the micro lens array 1 has multiple micro lenses 3 each of which has an apex 4; and
(4) Each apex 4 of the multiple micro lenses 3 is to be displaced from the corresponding lattice cell point 11 of the primitive lattice by an individually different displacement amount. The primitive lattice includes the multiple lattice cell points 11 positioned at equidistant intervals.

The micro lens array 1 according to Embodiment 1 makes it easier to arrange the basic pattern lens group 2 adjoining to each other, while ensuring the positioning randomness of the apexes 4.

The micro lens array 1 according to Embodiment 1 also satisfies the following requirements (1) to (4):
(1) The primitive lattice is a square lattice 10;
(2) The dividing lines B1 to B7 include straight lines with which the multiple micro lenses 3 contained in the basic pattern lens group 2 are contact. For example, the dividing lines B1 to B7 according to Embodiment 1 are shown as straight lines;
(3) The pairs of apexes 4 of the micro lenses 3 adjoining to each other across the shared dividing lines B1 to B7 are to be positioned line-symmetrically about the shared dividing lines; and
(4) The pairs of apexes 4 of the micro lenses 3 adjoining to each other across the shared dividing lines B1 to B7 are to be displaced to positions on straight lines that pass through the lattice cell points 11 and run parallel to the dividing lines.

The micro lens array 1 according to Embodiment 1 can prevent the apexes 4 of the micro lenses 3 adjoining to each other from overlapping.

The micro lens array 1 according to Embodiment 1 also satisfies the following requirements (1) and (2). Here, the unit pattern area 12 is an area which includes a single lattice cell point 11.

(1) The primitive lattice is partitioned by second dividing lines M1 which include bisectors of the line segments linking the lattice cell points of the unit pattern areas 12 adjoining to each other, and
(2) The displacement amount of the apex 11 of each micro lens 3 is within the second dividing lines M1 of the corresponding unit pattern area 12.

<Image Display Device 100>

Next, an image display device 100 according to Embodiment 1 will be explained.

Figure 4:
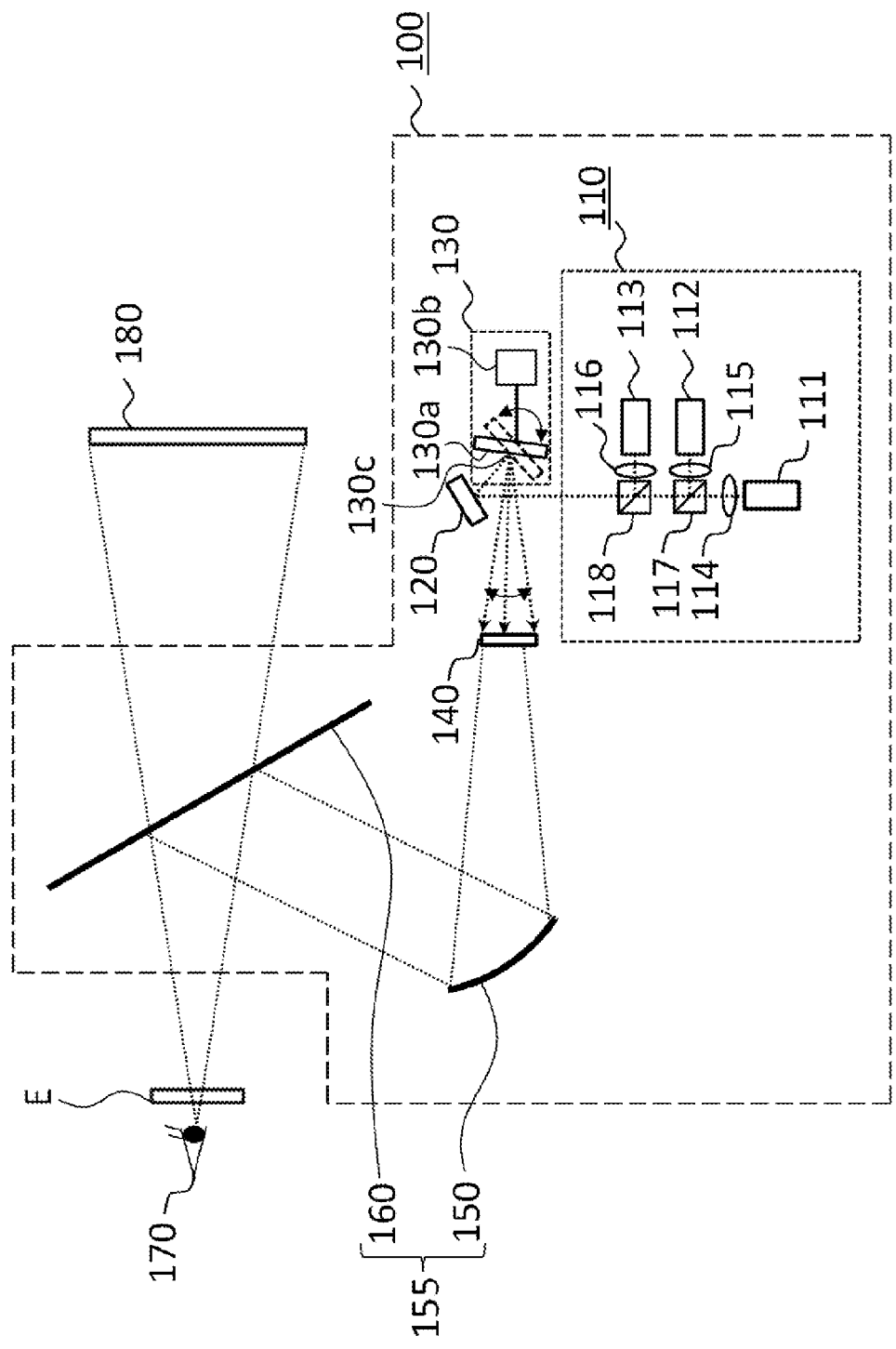
FIG. 4 is a diagram schematically illustrating an image display device according to Embodiment 1 of the present invention.

FIG. 4 is a diagram schematically illustrating a configuration of the image display device 100 according to Embodiment 1.

In the following embodiments, a micro lens array for screens of head-up displays will be explained. The micro lens array to be described in the embodiments, however, can be applied for example to such items from a small size laser scan projector and a camera finder. The micro lens array to be described in the embodiments can also be applied for example to a display for TV and PC. Furthermore, the micro lens array to be described in the embodiments can be applied to display devices or the like with an image display device function used for example for vehicles, ships, aircrafts, or factory facilities.

As shown in FIG. 4, the image display device 100 according to Embodiment 1 includes a light source unit 110, a MEMS (Micro Electric Mechanical System) mirror device 130 (hereinafter may be referred to as a scanning unit), a screen 140, and a magnifying mirror 150. The image display device 100 may include a mirror 120.

Here, if the windshield has curvature and contributes for collecting beams, it constitutes the image display device 100 as a part of an optical element unit 155 (a light collecting optical system) together with the magnifying mirror 150.

The mirror 120 reflects beams from the light source unit 110. The MEMS mirror device 130 provides the beams reflected by the mirror 120 with image information. Image beams emerging from the MEMS mirror device 130 are projected on the screen 140, which includes the micro lens array 1. The magnifying mirror 150 magnifies and reflects an image generated on the screen 140.

The magnifying mirror 150 collects beams from the screen 140, and magnifies the image generated on the screen 140 to provide a driver with the image as a virtual image 180.

The light source unit 110 may include semiconductor lasers 111, 112 and 113; a beam-combining prism 117 and 118, and coupling lenses 114, 115 and 116.

The semiconductor lasers include a red semiconductor laser 111, a green semiconductor laser 112, and a blue semiconductor laser 113. Namely, the light source unit 110 includes light sources to emit beams having the three types of wavelength, respectively.

The beam-combining prisms 117 and 118 either transmit or reflect the laser beams emitted from the semiconductor lasers 111, 112 and 113, through which the laser beams are parallelly combined along a same axis. In FIG. 4, the light source unit 110 has two beam-combining prisms 117 and 118.

The beam-combining prism 117 transmits a red laser beam emitted from the semiconductor laser 111 and reflects a green laser beam emitted from the semiconductor laser 112. The beam-combining prism 118 transmits the red laser beam and the green laser beam combined by the beam-combining prism 117 and reflects a blue laser beam emitted from the semiconductor laser 113.

The coupling lenses 114, 115 and 116 concentrate the laser beams emitted from the semiconductor lasers 111, 112 and 113, respectively. The coupling lens 114 concentrates the red laser beam emitted from the semiconductor lasers 111. The coupling lens 115 concentrates the green laser beam emitted from the semiconductor lasers 112. The coupling lens 116 concentrates the blue laser beam emitted from the semiconductor lasers 113.

The coupling lens 114 is arranged between the red semiconductor laser 111 and the beam-combining prism 117; the coupling lens 115 is arranged between the green semiconductor laser 112 and the beam-combining prism 117; the coupling lens 116 is arranged between the blue semiconductor laser 113 and the beam-combining prism 118.

The mirror 120 reflects the laser beam emitted from the light source unit 110 toward the MEMS mirror device 130. The laser beam emitted from the light source unit 110 is a combined beam consisting of the red laser beam, green laser beam and blue laser beam.

The MEMS mirror device 130 generates image beams which contain image information, and functions as a scanning unit to scan the laser beams.

The MEMS mirror device 130 includes a mirror 130a, and may include a driving unit 130b.

The driving unit 130b can swing the mirror 130a around a pivot center 130c. Here, to "swing" means to move from side to side; therefore, the driving unit 130b swings the mirror 130a.

The MEMS mirror device 130 two-dimensionally scans the laser beams reflected by the mirror 120 over the surface of the screen 140. The two-dimensional scan is achieved by swinging the mirror 130a. That is to say, the mirror 130a swings around two orthogonal axes.

Here, an image generated on the surface of the screen 140 by the MEMS mirror device 130 is called an intermediary image.

The screen 140 includes the micro lens array 1, which is a collection of the micro lenses 3. The micro lenses 3 included on the screen 140 diffuse and output beams which enter the micro lenses 3, in accordance with the material property (the refractive index) and curvature.

"Curvature" indicates an amount by which a line or a plane is curved. A lens which is made of high refractive material and has a small radius of curvature has a short focal distance. A radius of curvature is the inverse of curvature.

In the diffusion angle characteristic of the beam emerging from the micro lens 3, a diffusion angle $\theta$ expressed in full angle is defined so that luminosity at the diffusion angle is a half of the central luminosity. The diffusion angle $\theta$ is also called a divergence angle.

The diffusion angle $\theta$ of the micro lens 3 has to be designed in advance such that the angle will be a required diffusion angle. "The required diffusion angle", for example, is an angle large enough for the beam to cover the entire range of an eye box E.

Thus, the image display device 100 is capable of diffusing the beam entering the screen 140 having the micro lens array 1 toward a necessary area. The image display device 100 diffuses the beam entering the screen 140 toward the necessary area. "The necessary area" is, for example, a range to cover the entire range of the eye box E which is to be fully irradiated with the beam. As the result, the laser beam emitted from the light source unit 110 can be efficiently used.

Other than the micro lens array 1, a complete diffusion plate which diffuses a beam in all directions may be used for the screen 140. The micro lens array 1 according to Embodiment 1, however, is capable of controlling the diffusion angle θ of the beam. The micro lens array 1, therefore, can display a brighter image than a complete diffusion plate, which leads to higher visibility for drivers when used for vehicle-mounted devices.

The magnifying mirror 150 is a concave mirror or the like, which magnifies and reflects an intermediate image (image light) displayed on the screen 140 to produce the virtual image 180.

The laser beams (the image beams) carrying image information reflected by the magnifying mirror 150 are again reflected by the windshield 160 to enter the driver's (human) eye 170. In short, the laser beams (the image beams) carrying image information reach the eye box E.

The region to which the image beams reach is called the eye box E, which is set as a region within which driver's eye 170 may position while driving. In other words, the eye box E can be regarded as an inside-vehicle region within which the driver's eye may move while the drive sits on the driver seat, for example, and has a size of 20 cm×10 cm×10 cm. Thus, the eye box E extends, from the driver's eye position, in the depth direction as well as in the longitudinal and lateral directions.

The driver's eye 170 can move inside the eye box E region. So, note that these words, the driver's eye 170 and the eye box E, are interchangeably understood in explanation of embodiments.

The image projected on the windshield 160 is superimposed on the driver's view ahead, and is viewed as a virtual image 180 from the driver's eye 170. The driver can perceive the virtual image 180 when the driver's eye 170 is positioned in a region which is called the eye box E and provides the driver with the visual perception. In other words, the driver can perceive the virtual image 180 when the driver's eye 170 is inside the eye box E.

<Reduction of Luminance Unevenness in Displayed Image>

Next, explanation will be given on the angle of the laser beam emerging from the image display device 100 to further improve visibility of the displayed image. In the following description on optical paths, beam is referred to as ray.

The repetition structure of the micro lens array 1 causes luminance unevenness on an image projected on the windshield 160. Due to diffraction, the beams emerging from the micro lens array 1 generate bright spots Bp. The bright spots Bp result from the beams diffracted by the micro lens array 1. The micro lens array 1 produces a zero-order diffracted beam, a first-order diffracted beam, and a second-order diffracted beam and so on, which generate the bright spots Bp.

Due to the existence of a plurality of bright spots Bp, the beams emitted from the light source unit 110 have luminance unevenness. Here, the larger the interval between the bright spots Bp are, the lower the visibility of the displayed image becomes. Hereinafter, the interval between bright spots Bp will be referred to as a bright spot interval Lb.

The bright spot interval Lb is, for example, the distance between the bright spot Bp of the zero-order diffracted beam and the bright spot Bp of the first-order diffracted beam. In a same way, the bright spot interval Lb is also the distance between the bright spot Bp of the first-order diffracted beam and the bright spot Bp of the second-order diffracted beam. Here, the smaller the bright spot interval Lb is, the higher the visibility of the displayed image will be. Namely the bright spots will become less perceivable.

In order to make the bright spot Bp unperceivable for drivers, another technique needs to be devised about the angle for the image beam to enter into the driver's eye 170. Next, explanation will be made on a method to determine the angle for the image beam to enter a human (hereinafter, referred to as driver for explanation) eye 170.

Figure 5:
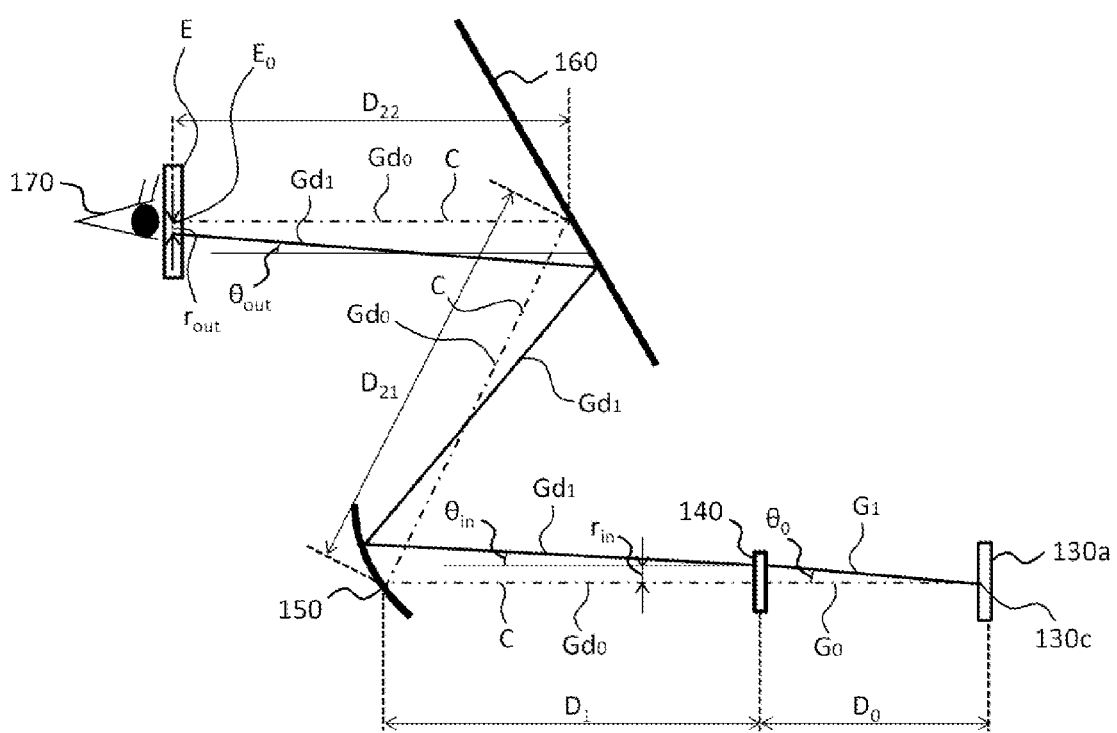
FIG. 5 is a diagram illustrating an optical path of a beam emerging from the image display device according to Embodiment 1 of the present invention.

FIG. 5 is a diagram illustrating the optical path of the image beam which emerges from the image display device 100 shown in FIG. 4, and then is reflected by the windshield 160, finally reaches the driver's eye 170. In FIG. 5, the mirror 120, the light source unit 110, and the virtual image 180, which are shown in FIG. 4, are omitted. Components other than the omitted components are the same configuration in positional relation and the like shown in FIG. 4, so their explanation too will be omitted.

The dashed and dotted line in FIG. 5 is an optical axis C of the image display device 100. The optical axis C is a line linking, for example, the pivot center 130c of the movable mirror 130a in the MEMS mirror device 130 and the center of the human eye 170. Because the human eye 170 moves around within the eye box E, it can be assumed that the center of the human eye 170 is defined as the center of the eye box E. In short, the optical axis C is a line linking, for example, the pivot center 130c of the movable mirror 130a in the MEMS mirror device 130 and the center $E_0$ of the eye box E.

In Embodiment 1, the screen 140 is arranged so as to be perpendicular to the optical axis C. Therefore, the dashed and dotted line in FIG. 5 shows the optical path of the ray $G_0$ extending perpendicularly from the center of the screen 140. Namely, the ray $G_0$ is a ray passing through the center of the screen 140 when the MEMS mirror device 130 scanning the laser beam.

In Embodiment 1, the optical path of the ray is defined as the optical axis C. Here, the optical axis C is bended by the magnifying mirror 150 and the windshield 160. Therefore, the optical axis C, for example, linking the pivot center 130c of the movable mirror 130a of the MEMS mirror device 130 and the eye box center $E_0$ is optically straight.

In FIG. 5, the distance between the mirror 130a of the MEMS mirror device 130 and the screen 140 is the distance $D_0$ [mm], the distance between the screen 140 and the magnifying mirror 150 is the distance $D_1$ [mm], the distance between the magnifying mirror 150 and the windshield 160 is the distance $D_{21}$ [mm], the distance between the windshield 160 and the driver's eye 170 (the eye box center $E_0$) is the distance $D_{22}$ [mm], and the distance (not shown) between the magnifying mirror 150 and the driver's eye 170 (the eye box center $E_0$) is the distance $D_2$ ($D_2=D_{21}+D_{22}$) [mm]. Note that the distance $D_2$, here, is a distance under assumption that the windshield 160 is flat-shaped to have no beam-collecting function. Also, each of the distances $D_0$, $D_1$, $D_{21}$, $D_{22}$, and $D_2$ is a distance on the optical axis C.

Here, the angle formed by a ray G entering the screen 140 from the MEMS mirror device 130 and the optical axis C is an angle $\theta_0$ [rad]. The ray G is a laser beam scanned by the MEMS mirror device 130. The ray G is inclined to the optical axis C by the angle $\theta_0$ [rad]. Because the ray G is scanned by the MEMS mirror device 130, the angle $\theta_0$ [rad] changes with time.

The angle $\theta_0$ [rad] is an angle formed between the ray $G_0$ which enters the screen 140 and corresponds to the zero-order diffracted beam $Gd_0$ passing through the eye box center $E_0$ and the ray $G_1$ which enters the screen 140 and corresponds to the first-order diffracted beam $Gd_1$ passing therethrough.

The ray G emerging from the MEMS mirror device 130 is diffracted by the screen 140 and emerges to form an angle $\theta_{in}$ [rad] against the optical axis C. Here, for example, the angle $\theta_{in}$ [rad] is an angle formed between the first-order diffracted beam $Gd_1$ which is the ray G diffracted by the screen 140 (the micro lens array 1), and the optical axis C. In other words, the first-order diffracted beam $Gd_1$ is inclined to the optical axis C by the angle $\theta_{in}$ [rad].

This first-order diffracted beam $Gd_1$ is a beam that is the first-order diffracted beam entering the eye box E and passes through the eye box center $E_0$. Thus, the angle $\theta_{in}$ [rad] is an angle formed between a beam that is part of the first-order diffracted beam $Gd_1$ diffracted from the ray G by the screen 140 (the micro lens array 1) and passes through the eye box center $E_0$ and a beam that is part of the zero-order diffracted beam $Gd_0$ diffracted from the ray G by the screen 140 (the micro lens array 1) and passed through the eye box center $E_0$.

A beam that is part of the zero-order diffracted beam $Gd_0$ and enters the eye box E to pass through the eye box center $E_0$ is usually on the optical axis C. Therefore, the optical axis C can be regarded as the zero-order diffracted beam $Gd_0$ passing through the eye box center $E_0$ and can be regarded as the ray $G_0$ entering the screen 14 corresponding to the zero-order diffracted beam $Gd_0$. Here, the zero-order diffracted beam $Gd_0$ is a beam into which the ray $G_0$, entering the screen 14, is diffracted in zero-order.

The first-order diffracted beam $Gd_1$, reflected by the windshield 160 and then entering the driver's eye 170, and the optical axis C form an angle $\theta_{out}$ [rad]. Namely, the first-order diffracted beam $Gd_1$ emerging from the screen 140 at the angle $\theta_{in}$ [rad] from the optical axis C enters the eye 170 at the angle $\theta_{out}$ [rad] from the optical axis C.

The angle $\theta_{out}$ [rad] is an angle formed between the first-order diffracted beam $Gd_1$ passing through the eye box center $E_0$ and the zero-order diffracted beam $Gd_0$ passing therethrough.

The distance between a position on the screen 140, at which the ray G enters from the MEMS mirror device 130, and the optical axis C is referred to as a distance $r_{in}$ [mm]. The distance between a position at which the first-order diffracted beam $Gd_1$ reflected by the windshield 160 enters the driver's eye 170, and the optical axis C is referred to as a distance $r_{out}$ [mm]. Thus, the distance $r_{out}$ [mm] is the distance between a position at which the first-order diffracted beam $Gd_1$ enters the eye box E and the optical axis C. Here, the entering position into the eye box E is on a plane which includes the eye box center $E_0$ and is perpendicular to the optical axis C.

Next, the configuration shown in FIG. 6 will be explained.

Figure 6:
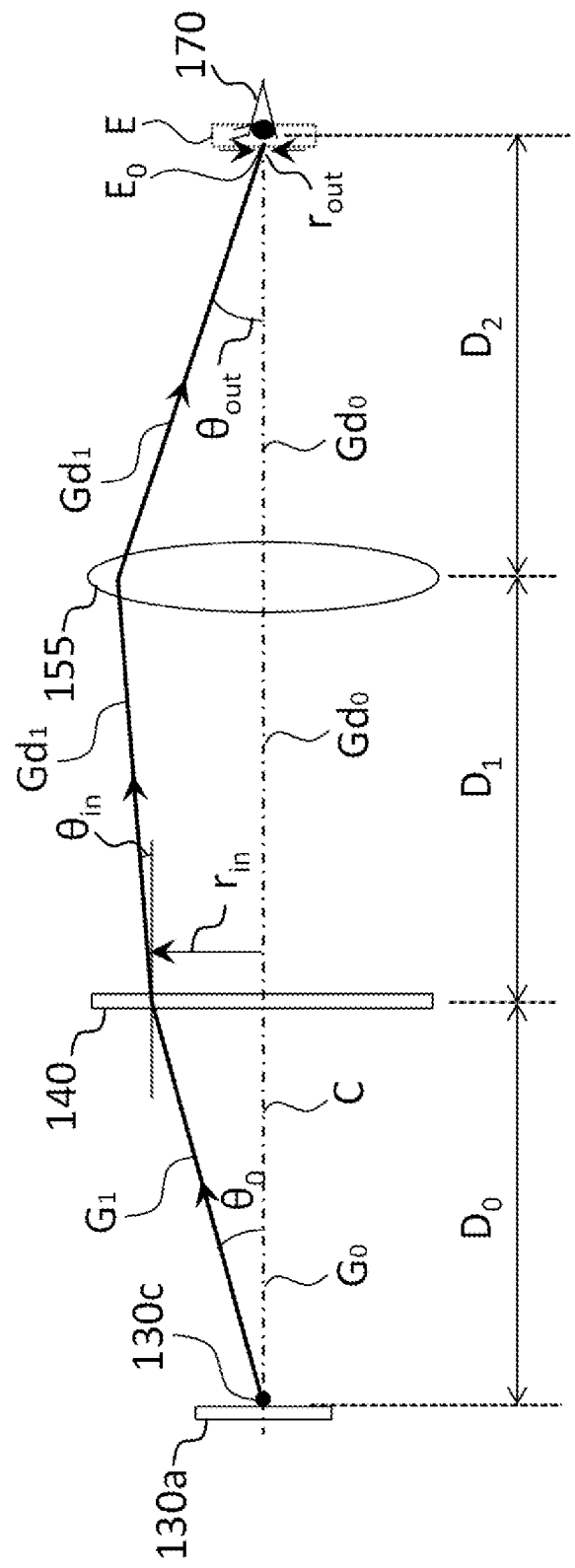
FIG. 6 is a diagram simply illustrating an optical configuration of the image display device according to Embodiment 1 of the present invention.

The configuration shown in FIG. 6 shows a simplified optical path. The above explained angles and distances are collectively referred to as "various variables".

FIG. 6 is a diagram showing an optical relation between the image display device 100 and the driver's eye 170, which is simplified from that illustrated in FIG. 5. In FIG. 6, the ray G runs from the left to the right.

In FIG. 6, the magnifying mirror 150 and the windshield 160, both shown in FIG. 5, are replaced by the single optical element unit 155. In short, the optical element unit 155 is an optical system to generate a virtual image from an image generated on the screen 140. A dashed and dotted line in FIG. 6 is the optical axis C which passes through the center of the screen 140 and is perpendicular to the screen 140.

In FIG. 6, the MEMS mirror device 130 (the mirror 130a) is disposed along the optical axis C at the left side of the screen 140; and the driver's eye 170 (the eye box E) is positioned along the optical axis C at the right side of the screen 140.

In other words, the driver's eye 170 (the eye box E) is disposed at a side of the screen 140 which is different from a side where the MEMS mirror device 130 (the mirror 130a) is disposed. Namely, the screen 140 is disposed between the MEMS mirror device 130 (the mirror 130a) and the driver's eye 170 (the eye box E) along the optical axis C.

The optical element unit 155 is disposed between the driver's eye 170 and the screen 140. The optical element unit 155 and the screen 140 share the same optical axis.

In Embodiment 1, the optical element unit 155 includes the magnifying mirror 150 and the windshield 160. However, for example, in a case where the windshield 160 is flat and thereby does not have a function of collecting beams, the windshield 160 is not included in the optical element unit 155. The optical element unit 155 may include an optical device other than the magnifying mirror 150 and the windshield 160.

The focal distance of the optical element unit 155 is denoted as f. As explained in FIG. 5, the distance between the optical element unit 155 and the driver's eye 170 on the optical axis C is denoted as $D_2$. The various variables other than those denoted here are as explained in FIG. 5.

As shown in FIG. 6, the ray G emerging from the MEMS mirror 130 enters the screen 140 at a position $r_{in}$ [mm] high from the optical axis C. The emergence angle of the ray G emerging from the MEMS mirror 130 is $\theta_0$ [rad]. Note, however, that the angle $\theta_0$ [rad] changes as the ray G is scanned by the MEMS mirror 130.

After entering the screen 140, the ray G is diffracted by the micro lens array 1 of the screen 140. The diffraction angle of the diffracted beam is determined, for example, from the repetition structure of the basic pattern lens group 2.

The first-order diffracted beam $Gd_1$ of the ray G entering the screen 140 emerges from the screen 140 at an angle $\theta_{in}$ [rad]. The angle $\theta_1$ [rad] is an angle formed by the first-order diffracted beam $Gd_1$ and the optical axis C.

Then, the first-order diffracted beam $Gd_1$ emerging from screen 140 passes through the optical element unit 155. The optical element unit 155 has a positive power with the focal distance f [mm].

After passing through the optical element unit 155, the first-order diffracted beam $Gd_1$ enters the driver's eye 170. An entering angle for the first-order diffracted beam $Gd_1$ to enter the driver's eye 170 (the eye box E) is $\theta_{in}$ [rad]. The angle $\theta_{out}$ [rad] is an angle formed by the first-order diffracted beam $Gd_1$ and the optical axis C. The first-order diffracted beam $Gd_1$ enters the driver's eye 170 at a position $r_{out}$ [mm] high from the optical axis C. The height $r_{out}$ [mm] is determined from the position of the eye box center $E_0$.

Figure 7:
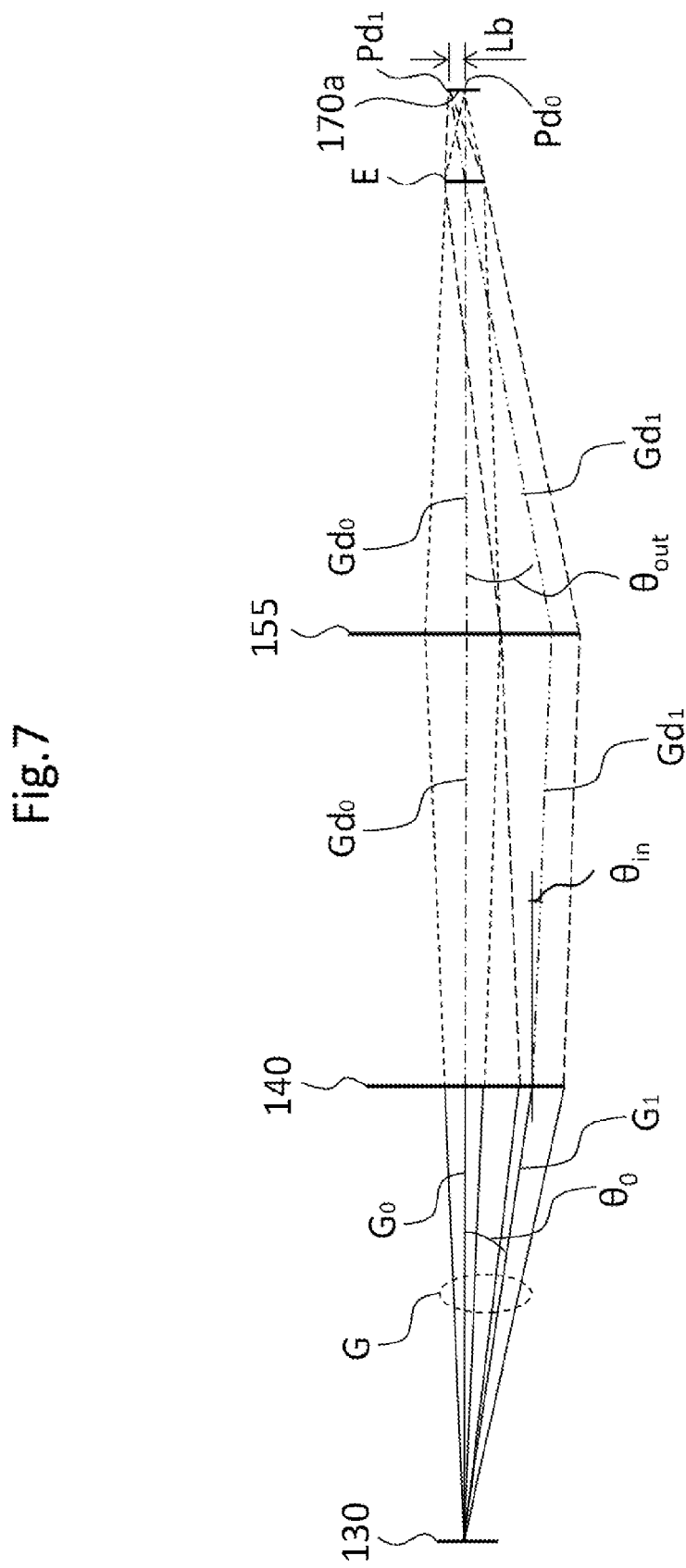
FIG. 7 is a diagram illustrating a simulation result of the image display device according to Embodiment 1 of the present invention.

FIG. 7 shows a simulation result of the optical system shown in FIG. 6.

Shown in FIG. 7 are only zero-order diffracted beams $Gd_0$ and first-order diffracted beams $Gd_1$ which are beams diffracted from the ray G scanned over screen 140 and enter the eye box E. Also, shown as the ray G are only rays which correspond to the zero-order diffracted beams $Gd_0$ and the first-order diffracted beams $Gd_1$ which enter the eye box E. In FIG. 7, the ray G exists as a plurality of rays; therefore, they are circled by a broken line with a symbol G.

The rays G scanned over the screen 140 are shown as solid lines. The zero-order diffracted beams are shown as fine broken lines. A zero-order diffracted beam $Gd_0$ passing through the luminous flux center of the zero-order diffracted beams is shown as a dashed and dotted line. The first-order diffracted beams are shown as coarse broken lines. A first-order diffracted beam $Gd_1$ passing through the luminous flux center of the first-order diffracted beams is shown as an alternate long and two dashes line.

The zero-order diffracted beam $Gd_0$ passing through the luminous flux center of the zero-order diffracted beams passes through the eye box center $E_0$. Also, the first-order diffracted beam $Gd_1$ passing through the luminous flux center of the first-order diffracted beams passes through the eye box center $E_0$.

The first-order diffracted beam $Gd_1$ shown in FIG. 6 is the first-order diffracted beam $Gd_1$ passing through the luminous flux center of the first-order diffracted beams shown in FIG. 7. Also the zero-order diffracted beam $Gd_0$ shown in FIG. 6 is the zero-order diffracted beam $Gd_0$ passing through the luminous flux center of the zero-order diffracted beams shown in FIG. 7.

Among the diffracted beams entering the eye box E, the zero-order diffracted beam $Gd_0$ passing through the luminous flux center of the zero-order diffracted beams and the first-order diffracted beam $Gd_1$ passing through the luminous flux center of the first-order diffracted beams form the angle $\theta_{out}$. Among the diffracted beams entering the eye box E, the zero-order diffracted beam $Gd_0$ that is part of the luminous flux of the zero-order diffracted beams and passes through the eye box center $E_0$ and the first-order diffracted beam $Gd_1$ that is part of the luminous flux of the first-order diffracted beams and passes through the eye box center $E_0$, form the angle $\theta_{out}$.

Similarly, among the diffracted beams emerging from the screen 140, the zero-order diffracted beam $Gd_0$ passing through the luminous flux center of the zero-order diffracted beams and the first-order diffracted beam $Gd_1$ passing through the luminous flux center of the first-order diffracted beams form the angle $\theta_{in}$. Among the diffracted beams emerging from the screen 140, the zero-order diffracted beam $Gd_0$ that is part of the luminous flux of the zero-order diffracted beams and passes through the eye box center $E_0$ and the first-order diffracted beam $Gd_1$ that is part of the luminous flux of the first-order diffracted beams and passes through the eye box center $E_0$, form the angle $\theta_{in}$.

Similarly, among the rays reflected by the mirror 130a, the ray $G_0$ entering the screen 140 that corresponds to the zero-order diffracted beam $Gd_0$ and passes through the luminous flux center of the zero-order diffracted beams and the ray $G_1$ entering the screen 140 that corresponds to the first-order diffracted beam $Gd_1$ and passes through the luminous flux center of the first-order diffracted beams form the angle $\theta_0$. Among the rays reflected by the mirror 130a, the ray $G_0$ entering the screen 140 that corresponds to the zero-order diffracted beam $Gd_0$ and passes through the eye box center $E_0$ and the ray $G_1$ entering the screen 140 that corresponds to the first-order diffracted beam $Gd_1$ and passes through the eye box center $E_0$ form the angle $\theta_0$.

As shown in FIG. 7, the zero-order diffracted beam $Gd_0$ is focused on a focal point $Pd_0$ on an imaging surface 170a (retina). Also, the first-order diffracted beam $Gd_1$ is focused on a focal point $Pd_1$ thereon. Here, the distance between the focal point $Pd_0$ and the focal point $Pd_1$ is a bright spot interval Lb on the imaging surface 170a (retina). In short, the focal points $Pd_0$ and $Pd_1$ correspond to the above-described bright spots. Therefore, the angle $\theta_{out}$ smaller than the visual angle limit $V_{min}$ makes it difficult for drivers to distinguish the focal point $Pd_0$ and the focal point $Pd_1$.

The angle $\theta_{out}$ [rad] is an angle at which the first-order diffracted beam $Gd_1$ included in the image beams enters the driver's eye 170. By changing the angle $\theta_{out}$ [rad], it is possible to make the bright spot interval Lb of the diffracted beam less distinguishable for drivers.

When human eyesight is denoted as eyesight a, the eyesight a is the inverse of a perceivable minimum visual angle $V_{min}$. Namely, a relational expression of eyesight $a=1/V_{min}$ holds. Here, the unit of the visual angle $V_{min}$ is "minute of arc". The visual angle V is denoted as $a^{-1}$ [(min)]. Namely, the visual angle $V_{min}$ is the inverse of the eyesight a.

Taking an example of the human eye, the visual angle V is explained as an angle formed by two straight lines drawn from each of the two ends of an object to the eye. When the object is of a height Sv and is a distance Dv away from a nodal point of the eye, the visual angle V is expressed as an equation V=2 arctan (Sv/(2Dv)). When a beam entering a lens diagonally to the optical axis emerges parallelly to the original entering beam, nodal points are points at which the extended portions of the entering beam and the emerging beam each intersect the optical axis. Here, the distance Dv is the distance from the center of the eye's entrance pupil to the object.

For imaging devices such as a camera instead of a human eye, the visual angle of the imaging device divided by the number of its imaging elements' pixels corresponds to the perceivable minimum visual angle $V_{min}$.

In Japan for example, a first-class driver's license for normal vehicles requires drivers with eyesight less than 0.7 to drive with eyeglasses or contact lenses. Hence, the visual angle limit $V_{min}$ in Japan is 1.43 minutes (1/0.7=1.43). By the way, Landolt rings are generally used for measuring eyesight a in Japan.

Therefore, a driver with eyesight of 0.7 has difficulty to perceive images of a visual angle V less than the visual angle limit $V_{min}$ (1.43 minutes).

The visual angle limit $V_{min}$ is the minimum visual angle V needed for those who are to recognize an image displayed by the image display device 100. That is to say, the visual angle limit $V_{min}$ is the minimum visual angle V needed for drivers.

It is preferable that the angle $\theta_{out}$ [rad] satisfies the following conditional expression (1). The conditional expression (1) means that the angle $\theta_{out}$ is smaller than the visual angle limit $V_{min}$. "1/a" in the conditional expression (1) is the visual angle limit $V_{min}$. Note that in Expression (1), the unit "minute" is converted to "rad" to express the visual angle limit $V_{min}$.

[Expression 1]

$$\theta_{out} < \frac{1}{a} \cdot \frac{1}{60} \cdot \frac{2\pi}{360} \text{ [rad]} \qquad (1)$$

Next, explanation will be made on the configuration of the micro lens array 1 to satisfy the condition given to the angle $\theta_{out}$ [rad].

The micro lens array 1 according to Embodiment 1 has the repetition structure of the basic pattern lens groups 2. Hence, the micro lens array 1 has a periodic structure with the repetition period L[mm] as the basic unit. More specifically, the two basic pattern lens groups 2, adjoining to each other, have the same-shaped micro lens 3 at their corresponding positions.

Therefore, the rays emerging from the micro lens array 1 (the screen 140) to the magnifying mirror 150 include the first-order diffracted beam $Gd_1$ resulting from the repetition period L[mm].

If the intervals between the micro lenses 3 are all identical to each other as shown in FIG. 2, the repetition period is the distance P1. However, as shown in FIG. 3, by randomly displacing the apexes 4 of the micro lenses 3, the repetition period is extended to the distance L.

As explained above, when the beams (the rays G) emitted from the light source unit 110 are diffracted by the micro lens array 1, the bright spots emerge on the image which the driver views. The repetition period L[mm] will be determined so as to make the bright spots unperceivable to the driver's eye 170 by shortening the interval between the bright spots.

The bright spots are the focal points $Pd_0$ and $Pd_1$ in FIG. 7.

Next, detailed explanation will be made on how to obtain the repetition period L[mm] at which the bright spot interval Lb in the images will make the bright spots unperceivable to the driver's eye 170.

In FIG. 6 a relation between the angle $\theta_0$ [rad] and the angle $\theta_{in}$ [rad] is expressed, at the screen 140, as the following Expression (2). A wavelength $\lambda$ [nm] is the wavelength of the ray G emitted from the light source unit 110. Expression (2) is based on the optical diffraction equation applied to the periodic structure which includes the repetition period L[mm].

[Expression 2]

$$L = \frac{\lambda}{\sin\theta_{in} + \sin\theta_0} \; [\text{mm}] \quad (2)$$

Generally, the larger the repetition period L is, the shorter the bright spot interval Lb of the displayed image will be. The shorter the repetition period L[mm] is, the longer the bright spot interval Lb of the displayed image will be. Hence, the range of the repetition period L[mm] at which the bright spot interval Lb makes the bright spots unperceivable to the driver's eye 170 is given by the relational expression (3) below.

[Expression 3]

$$L > \left| \frac{\lambda}{\sin\theta_{in} + \sin\theta_0} \right| [\text{mm}] \quad (3)$$

The relation between the angle $\theta_0$ [rad] and the angle $\theta_{in}$ [rad] indicated by Expression (3) will be explained using FIG. 6.

The relational equations among various variables about the rays' propagation can be easily obtained by using a ray matrix method for the components 130a, 140, 155 and E(170) shown in FIG. 6. The following Expression (4) represents a relation among the height $r_{in}$ [mm], the angle $\theta_{in}$ [rad], the height $r_{out}$ [mm] and the angle $\theta_{out}$ [rad]. The height $r_{in}$ [mm] is a distance from the optical axis C, by which the ray emerging from the screen 140 is away from the optical axis C. The height $r_{out}$ [mm] is a distance by which the ray entering the driver's eye 170 (the eye box E) is away from the optical axis C.

[Expression 4]

$$\begin{pmatrix} r_{out} \\ \theta_{out} \end{pmatrix} = \begin{pmatrix} 1 & D_2 \\ 0 & 1 \end{pmatrix} \begin{pmatrix} 1 & 0 \\ -\frac{1}{f} & 1 \end{pmatrix} \begin{pmatrix} 1 & D_1 \\ 0 & 1 \end{pmatrix} \begin{pmatrix} r_{in} \\ \theta_{in} \end{pmatrix} \quad (4)$$

$$= \begin{pmatrix} 1 & D_2 \\ 0 & 1 \end{pmatrix} \begin{pmatrix} 1 & 0 \\ -\frac{1}{f} & 1 \end{pmatrix} \begin{pmatrix} r_{in} + D_1\theta_{in} \\ \theta_{in} \end{pmatrix}$$

$$= \begin{pmatrix} 1 & D_2 \\ 0 & 1 \end{pmatrix} \begin{pmatrix} r_{in} + D_1\theta_{in} \\ -\frac{1}{f}(r_{in} + D_1\theta_{in}) + \theta_{in} \end{pmatrix}$$

Here, by putting $X = r_{in} + D_1\theta_{in}$, Equation (4) will be presented as the following Expression (5).

[Expression 5]

$$\begin{pmatrix} r_{out} \\ \theta_{out} \end{pmatrix} = \begin{pmatrix} X\left(1 - \frac{D_2}{f}\right) + D_2\theta_{in} \\ -\frac{X}{f} + \theta_{in} \end{pmatrix} \quad (5)$$

The angle $\theta_{out}$ [rad] of the ray entering the driver's eye 170 can be obtained as the following relational Expression (6) by substituting "0" for the height $r_{out}$ in the relational expression shown in the upper (first) row of Expression (4).

[Expression 6]

$$r_{out} = X\left(1 - \frac{D_2}{f}\right) + D_2\theta_{in} \quad (6)$$

$$0 = X\left(1 - \frac{D_2}{f}\right) + D_2\theta_{in}$$

$$X = -\frac{fD_2\theta_{in}}{f - D_2}$$

The relation between the angle $\theta_{in}$ [rad] and the angle $\theta_{out}$ [rad] is represented by the following Expression (7) derived from the relations shown by the lower row of Expression (5) and Expression (6).

[Expression 7]

$$\theta_{out} = -\frac{X}{f} + \theta_{in} \quad (7)$$

$$= \frac{D_2\theta_{in}}{f - D_2} + \theta_{in}$$

$$= \frac{D_2\theta_{in}}{f - D_2} + \frac{f - D_2}{f - D_2}\theta_{in}$$

$$= \frac{f}{f - D_2}\theta_{in}$$

Here, the angle $\theta_{out}$ [rad] needs to fall within the range shown in Expression (1). Hence, the range of the angle $\theta_{in}$ [rad] is obtained as following Expression (8) by substituting Expression (7) back into Expression (1).

[Expression 8]

$$\theta_{in} < \frac{f - D_2}{f} \cdot \frac{1}{a} \cdot \frac{1}{60} \cdot \frac{2\pi}{360} [\text{rad}] \quad (8)$$

The angle $\theta_{in}$ in Expression (8) corresponds to the angle $\theta_{out}$ less than the visual angle limit $V_{min}$. "1/a" in Expression (8) is the visual angle limit $V_{min}$.

If the angle $\theta_0$ [rad] shown in Expression (3) is represented with the angle $\theta_{in}$ [rad], Expression (9) holds from the geometric relation shown in FIG. 6.

[Expression 9]

$$\theta_0 = \tan^{-1}\frac{r_{in}}{D_0}[\text{rad}] \qquad (9)$$

Expression (10) below holds true, which is derived from the equation $X=r_{in}+D_1\theta_{in}$, Expression (6) and the relation between the height $r_{in}$ [mm] and the angle $\theta_{in}$ [rad] in Expression (9).

[Expression 10]

$$r_{in} = \theta_{in} \cdot \frac{D_1 D_2 - f(D_1 + D_2)}{f - D_2}[\text{mm}] \qquad (10)$$

Expression (11) bellow represents the relation between the angle $\theta_0$ [rad] and the angle $\theta_{in}$ [rad] by substituting Expression (10) into Expression (9).

[Expression 11]

$$\theta_0 = \tan^{-1}\left\{\frac{\theta_{in}}{D_0} \cdot \frac{D_1 D_2 - f(D_1 + D_2)}{f - D_2}\right\}[\text{rad}] \qquad (11)$$

The repetition period L[mm] shown in Expression (3) is determined so that Expression (8) and Expression (11) are satisfied. As the result, the bright spot interval Lb of the displayed image can be shortened to a level at which the bright spot is unperceivable to the driver's eye 170.

Among the various variables, the wavelength λ [nm] of the ray G emitted from the light source unit 110 is determined based on the wavelengths of the light source semiconductor lasers 111, 112 and 113, which are 638 nm (red), 515 nm (green) and 450 nm (blue) respectively. Among them, the wavelength with the highest luminosity function, for example, is used for the wavelength λ [nm] as a various variable.

A "luminosity function" is a value relatively expressing brightness feeling of light that has the same energy as light which has a reference wavelength light and whose brightness feeling is regarded as one. Usually, a yellow green light that has a wavelength of 555 [nm] to be felt brightest is adopted as the reference.

In Embodiment 1, it is desirable to use a green wavelength (515 nm) or the wavelength (555 nm) of "the most efficient photopic luminosity function", at which human eyes feel the light as brightest in comparison to light of the same energy.

Also, the visual angle limit $V_{min}$ (1/eyesight a) is determined considering the eyesight a of the driver of the vehicle mounting the image display device 100.

In Japan for example, a first class driver's license requires the driver's eyesight equal to or higher than 0.7. If a driver with eyesight a=0.7 using both eyes is set as the reference, the angle $\theta_{out}$ [rad]<4.16×10⁻⁴ [rad] is obtained from Expression (1).

In contrast, for a driver with eyesight a=2.0, the angle $\theta_{out}$ [rad]<1.45×10⁻⁴ [rad] is also obtained from Expression (1).

From the above explanations, it is more desirable for the angle $\theta_{out}$ [rad] to satisfy the following conditional Expression (12).

[Expression 12]

$$\theta_{out} < 1.45 \times 10^{-4} \text{rad} \qquad (12)$$

Other various variables f, $D_1$, $D_2$, and $D_0$ are determined depending on specifications of the image display device 100. For example, when the variables are given as follows: the focal distance f=300 [mm], the distance $D_1$=250 [mm], the distance $D_2$=1700 [mm] and the distance $D_0$=300 [mm], then the repetition period L[mm] is approximately 0.36 [mm].

Hence, in Embodiment 1, let the basic pattern lens group 2 be a square of 0.36×0.36 [mm] as the condition for the various variables. Also let the interval between the micro lenses 3 be 40 [μm]. Under these assumptions, about eighty micro lenses 3 need to be designed to make a micro lens array 1, which means significant reduction of design data.

In the micro lens array 1 according to Embodiment 1, none of the micro lenses 3 in contact with the dividing lines B1 to B7 is of a discontinuous shape, which in turn means that the dividing lines B1 to B7 are all straight lines. In each of the basic pattern lens groups 2, a same random pattern is used for arranging the micro lenses 3.

The micro lenses 3, therefore, can be repeatedly disposed in the same random arrangement. Unlike other cases such as complete diffusion plates, optically designed micro lens arrays 1 can be easily made in a short period of time.

However, the emergence angle $\theta_{out}$ [rad] from the image display device 100 according to Embodiment 1 may not satisfy Expression (12) in a case when the display is mounted to a different type of vehicles. For example, it is when at least one of the distance $D_{21}$ [mm] and the distance $D_{22}$ [mm] shown in FIG. 5 is changed. The distance $D_{21}$ [mm] is the distance from the magnifying mirror 150 to the windshield 160, and the distance $D_{22}$ [mm] is the distance from the windshield 160 to the driver's eye 170.

As shown in the above example, when the various variables are changed, the repetition period L[mm] of the basic pattern lens group 2 included in the micro lens array 1 is changed. With this alone, the image display device 100 can suppress the degradation of visibility caused by diffracted beams.

This means that there is no need to change variables associated with the image display device 100 such as the distance $D_0$ [mm], the distance $D_1$ [mm] or the focal distance f of the magnifying mirror 150. Here, the distance $D_0$ [mm] is the distance from the MEMS mirror 130 to the screen 140. The screen 140 is the micro lens array 1. The distance $D_1$ [mm] is the distance from the screen 140 to the magnifying mirror 150.

The image display device 100 according to Embodiment 1 includes the light source unit 110, the micro lens array 1 (the screen 140), the scanning unit 130 and the optical system 155.

The micro lens array 1 includes the multiple basic pattern lens groups 2. The scanning unit 130 reflects the beams emitted from the light source unit 110 to create images on the surface including the micro lens array 1. The optical system 155 is disposed along the optical axis C of the micro lens array 1 to project the images created on the micro lens array 1 onto the human eye 170 (retina).

The beam (the ray G) emitted from the light source unit 110 is diffracted by the micro lens array 1 to enter the human eye 170. The angle $\theta_{out}$ formed between the beam entering the human eye 170 (the first-order diffracted beam $Gd_1$) and the optical axis C is to fall, for example, within the range indicated by Expression (12).

Configuring the micro lens array 1 from the multiple basic pattern lens groups 2 can reduce, than the conventional methods, the design data for making the micro lens array 1 to be used for the screen 140 of the head-up display.

By setting the angle $\theta_{out}$, formed between the beam entering the human eye 170 (the first-order diffracted beam $Gd_1$) and the optical axis C, to a value satisfying Expression (12), the luminance unevenness can be reduced and the visibility of the displayed image can be improved.

Also in the image display device 100 according to Embodiment 1, the repetition period L[mm] of the basic pattern lens group 2 satisfies Expression (3) within the range indicated by Expression (8). For example, a value larger than 0.36 [mm] can be adopted as the repetition period L[mm]. Then, the luminance unevenness can be reduced and the visibility of the displayed image can be further improved.

The distance $D_2$ is the distance between the optical system 155 and the human eye 170 (the eye box center $E_0$). The wavelength $\lambda$ is the wavelength of the beam (the ray G) emitted from the light source unit 110. Angle $\theta_0$ is the angle formed between the beam (the ray G) entering the micro lens array 1 from the scanning unit 130 and the optical axis C. The angle $\theta_{in}$ [rad] is the diffracted angle of the first-order diffracted beam $Gd_1$ of the micro lens array 1. Here, the "diffracted angle" is the angle which is formed between the zero-order diffracted beam $Gd_0$ and the first-order diffracted beam $Gd_1$ when the beams emerge from the screen 140. The distance f is the focal distance of the optical system 155. Because the windshield 160 is assumed to be flat in FIG. 5, the distance f is the focal distance of the magnifying mirror 150. The eyesight a is the human (the driver's) eyesight to view the images displayed by the image display device 100. The repetition period L[mm] is the interval between the micro lenses 3 disposed in the corresponding positions of the basic pattern lens group 2 adjoining to each other.

Embodiment 2

In Embodiment 2, explanation will be made on the case where the screen 140 is disposed so as to be inclined by an angle $\theta_M$ to the optical axis C of the image display device 100 according to Embodiment 1.

Figure 8:
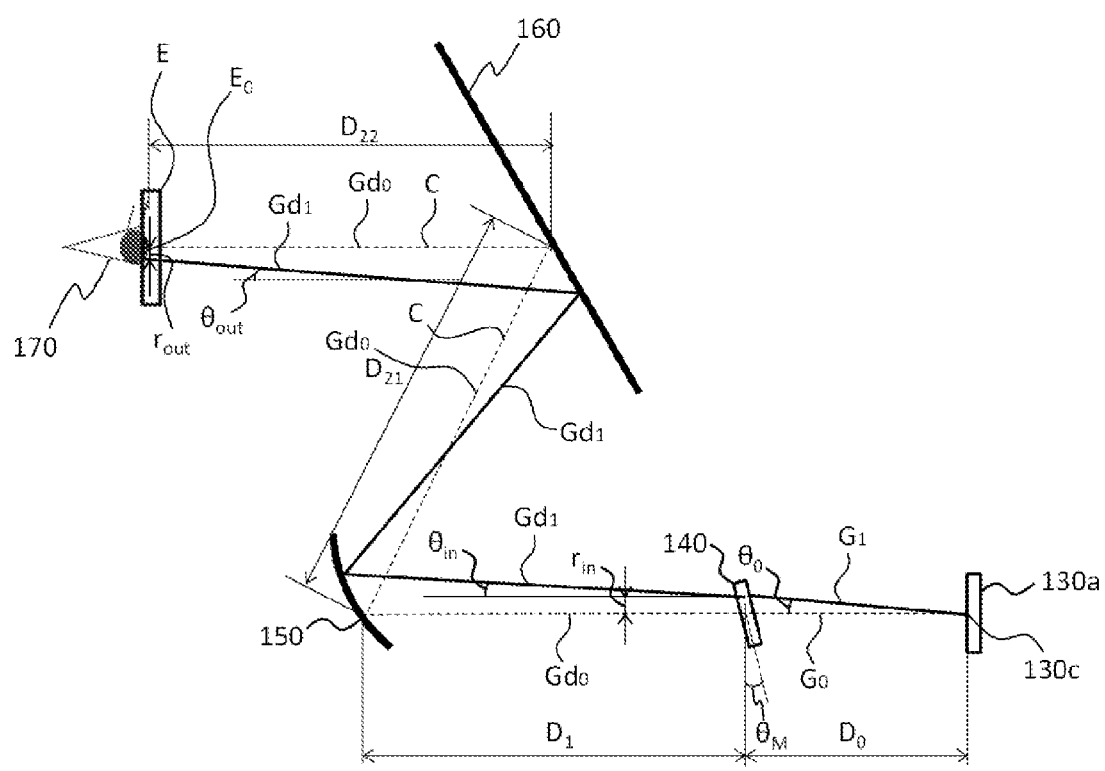
FIG. 8 is a diagram illustrating an optical path of a beam emerged from the image display device according to Embodiment 2 of the present invention.

In the case where the screen 140 is disposed so as to be inclined by the angle $\theta_M$ to the optical axis C of the image display device 100 according to Embodiment 1, FIG. 8 illustrates the optical path of an image beam, which emerges from the image display device 100 shown in FIG. 4, then is reflected by the windshield 160, and finally reaches the driver's eye 170.

In FIG. 8, omitted are the mirror 120, the light source unit 110, and the virtual image 180 which have been shown in FIG. 4. The other components shown in the figure also are in the same positional relation and the like as shown in FIG. 4. So, their explanation will be omitted. Also, in FIG. 8, the configurational components except for the screen 140 are in the same positional relation and the like as shown in FIG. 5, and their explanation will be omitted.

In FIG. 8, a distance $D_0$ [mm] is the distance from the MEMS mirror device 130 to the intersection point of the optical axis C and the screen 140. A distance $D_1$ [mm] is the distance from the above intersection point to the magnifying mirror 150. A distance $D_{11}$ [mm] is the distance from the above intersection point to a point of the screen 140 which is entered by the ray emerging from the MEMS mirror device 130 (See FIG. 9). The distance $D_{11}$ is expressed as $D_{11} \approx \theta_M \times r_{in}$. Note that the distances $D_0$, $D_1$, $D_{21}$ and $D_{22}$ are distances on the optical axis C. The distance $d_{11}$ is the distance in the direction parallel to the optical axis C.

Figure 9:
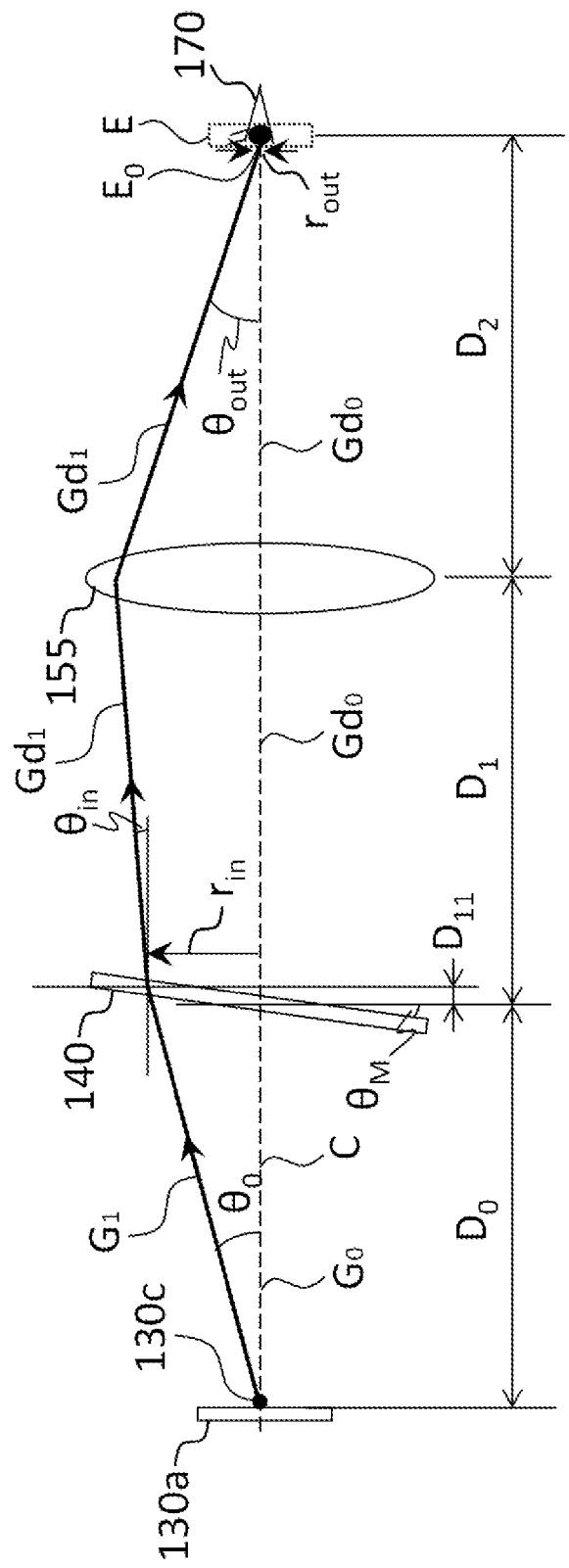
FIG. 9 is a diagram simply illustrating an optical configuration of the image display device according to Embodiment 2 of the present invention.

Next, the configuration shown in FIG. 9 will be explained. The configuration in FIG. 9 shows a simplified version of the optical path. The angles and distances shown above are collectively referred to as "various variables".

FIG. 9 is a diagram illustrating the simplified version of the optical relation between the image display device 100 and the driver's eye 170 shown in FIG. 8. In FIG. 9, the configurational components other than the screen 140 are in the same positional relation as in FIG. 6, and their explanation will be omitted.

Similarly to Embodiment 1, also the image display device 100 according to Embodiment 2 can make the bright spot interval Lb of the diffracted beam be unperceivable to the driver's eye 170 by changing the angle $\theta_{out}$ [rad]. The angle $\theta_{out}$ [rad] is the entering angle of the first-order diffracted beam $Gd_1$ included in the image beams to enter the driver's eye 170. It is desirable for the angle $\theta_{out}$ [rad] to satisfy the conditional Expression (1).

Next, the configuration of the micro lens array 1 which makes the angle $\theta_{out}$ [rad] satisfy the conditional Expression (1) will be explained.

The micro lens array 1 according to Embodiment 2 has a repetition structure of the basic pattern lens groups 2. Hence, the micro lens array 1 has a periodic structure with the repetition period L[mm] as the basic unit.

More specifically, the two basic pattern lens groups 2, adjoining to each other, each have the same-shaped micro lens 3 at their corresponding positions. Therefore, the rays emerging from the micro lens array 1 (the screen 140) to the magnifying mirror 150 include diffracted beam resulting from the repetition period L[mm].

As explained above, when the beams emitted from the light source unit 110 are diffracted by the micro lens array 1, bright spots emerge on the images which the driver views. The repetition period L[mm] will be determined so as to make the bright spots unperceivable to the driver's eye 170 by shortening the bright spot interval Lb.

Next, detailed explanation will be made on how to obtain the repetition period L[mm] at which the bright spot interval Lb makes the bright spots included in the image unperceivable to the driver's eye 170.

In FIG. 9, the relation between the angle $\theta_0$ [rad] and the angle $\theta_{in}$ [rad] is expressed, at the screen 140, as the following Expression (13). The wavelength $\lambda$ [nm] is the wavelength of the ray G emitted from the light source unit 110. Expression (13) is based on the optical diffraction equation applied to the periodic structure which includes the repetition period L[mm].

[Expression 13]
$$L = \frac{\lambda}{\sin(\theta_0 + \theta_M) + \sin(\theta_{in} + \theta_M)} [\text{mm}] \quad (13)$$

Hence, the range in which the bright spots become unperceivable to the driver's eye 170 will be given by the following relational Expression (14).

[Expression 14]
$$L > \left|\frac{\lambda}{\sin(\theta_0 + \theta_M) + \sin(\theta_{in} + \theta_M)}\right| [\text{mm}] \quad (14)$$

In FIG. 9, the distance $D_{11}$ is small enough in comparison to the distance $D_0$ or the distance $D_1$, to be ignored. Therefore, the angle $\theta_{in}$ [rad] and the angle $\theta_0$ [rad] which satisfy Expression (14) are to satisfy the conditional Expressions (8) and (11), similarly to Embodiment 1.

Thus, the repetition period L[mm] indicated by Expression (14) is determined so as to satisfy the relations indicated by Expression (8) and Expression (11). As the result, the bright spot interval Lb in the displayed image can be shortened enough to make the bright spots unperceivable to the driver's eye 170.

Embodiment 3

In Embodiment 3, a hexagonal lattice 21 (a regular hexagonal lattice) is adopted as the primitive lattice. Each of apexes 19 of micro lenses 18 is displaced from a lattice cell point 16 of the hexagonal lattice 21 by a predetermined displacement amount.

Figure 10:
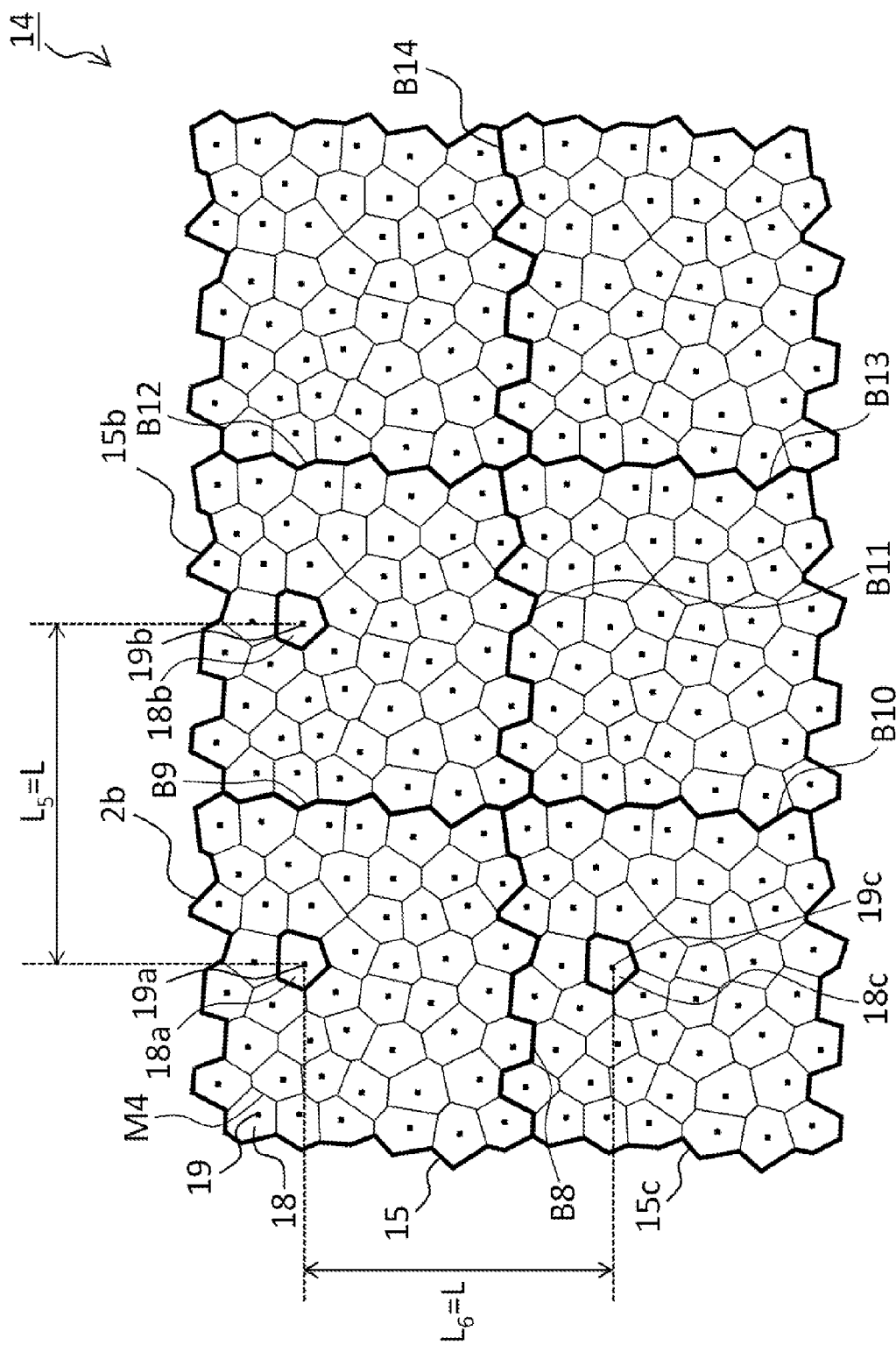
FIG. 10 is a drawing illustrating a micro lens array according to Embodiment 3 of the present invention.

FIG. 10 is a drawing illustrating a micro lens array 14 according to Embodiment 3.

In FIG. 10, a basic pattern lens group 15 is indicated as a larger area out of two kinds of areas which are different in size and framed by bold lines. As shown in FIG. 10, a micro lens array 14 includes multiple basic pattern lens groups 15.

The micro lens array 14 has a configuration in which two basic pattern lens groups are arranged in the longitudinal direction and the three basic pattern lens groups are arranged in the lateral direction. Namely, the multiple basic pattern lens groups 15 are arranged in 2×3 longitudinally and laterally, respectively. The multiple basic pattern lens groups 15 are arranged adjoining to each other across the dividing lines B8 to B14. In other words, the multiple basic pattern lens groups 15 are repeatedly arranged.

FIG. 10 shows a part of the micro lens array 14. Actually, the basic pattern lens groups 15 of more than six are repeatedly arranged in both longitudinal and lateral directions.

In the area of each basic pattern lens group 15, the multiple micro lenses 18 are disposed each of which is formed by a polygonal boundary. The black dots in the micro lenses 18 denote apexes 19 of the micro lenses 18.

The micro lens array 14 according to Embodiment 3 uses the hexagonal lattice 21 as its primitive lattice.

The micro lens array 14 includes multiple micro lenses 18. In the micro lens array 14, the apexes 19 of the multiple micro lenses 18 are points each displaced from the lattice cell points 16 of the hexagonal lattices 21 by different displacement amounts in different directions. Namely, the apexes 19 are arranged at positions to which the lattice cell points 16 of the hexagonal lattices 21 are randomly displaced. How to determine the positions of the apexes 19 will be explained later.

Here, explanation will be made on a repetition period L[mm] of the basic pattern lens group 15 according to Embodiment 3. The repetition period L[mm] is the minimum unit of the repetition structure of the micro lens array 14.

In FIG. 10, attention will be paid to the basic pattern lens group 15 and a basic pattern lens group 15b adjoining side-by-side to the right of the basic pattern lens group 15. The basic pattern lens group 15b is identical to the basic pattern lens group 15. The symbol 15b is given for explanation purpose.

A micro lens 18a and a micro lens 18b are disposed at respective positions corresponding to each other. The micro lens 18a is included in the basic pattern lens group 15. The micro lens 18b is included in the basic pattern lens group 15b. The micro lenses 18a and 18b are indicated by smaller areas framed by bold lines.

In FIG. 10, attention will be paid to the basic pattern lens group 15 and a basic pattern lens group 15c adjoining to the lower side thereof. The basic pattern lens group 15c is identical to the basic pattern lens group 15 and is given a symbol of 15c for explanation purpose.

The micro lens 18a and the micro lens 18c are disposed at the respective positions corresponding to each other. The micro lens 18a is included in the basic pattern lens group 15. The micro lens 18c is included in the basic pattern lens group 15c. The micro lens 18c is indicated by a smaller area framed by bold lines.

The lateral distance between an apex 19a and an apex 19b is determined as a repetition period $L_5$. Then, the longitudinal distance between the apex 19a and an apex 19c is determined as a repetition period $L_6$. Here, the apex 19a is the apex of the micro lens 18a. The apex 19b is the apex of the micro lens 18b. The apex 19c is the apex of the micro lens 18c.

Next, detailed explanation will be made on how to dispose the micro lens 18 shown in FIG. 10. The micro lens 18 is included in the basic pattern lens group 15 of the micro lens array 14.

Figure 11:
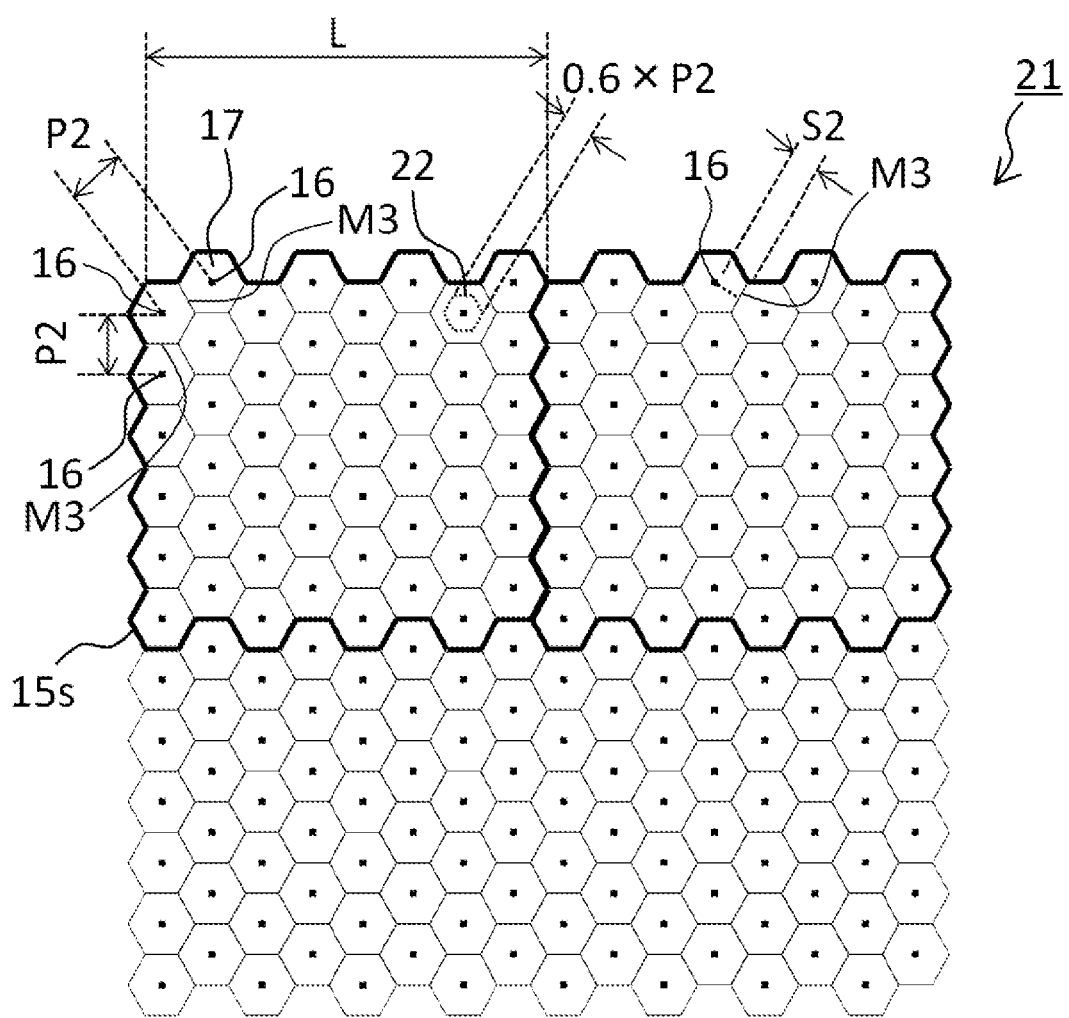
FIG. 11 is a drawing illustrating a primitive lattice used for designing the micro lens array according to Embodiment 3 of the present invention.

FIG. 11 is a drawing for explaining a primitive lattice which is the reference for the apex 19 of the micro lens 18 according to the Embodiment 3 of the present invention to be positioned. The micro lens 18 is included in the micro lens array 14.

As shown in FIG. 11, multiple unit pattern areas 17 are arranged so that a hexagonal lattice 21 will be formed in which every distance between adjacent lattice cell points 16 takes a distance of P2. In FIG. 11, for simplification, a symbol of 16 to indicate the lattice cell point is given only to four unit pattern areas 17 among the multiple unit pattern areas 17. The hexagonal lattice 21 includes multiple basic pattern lens groups 15s.

Here, the unit pattern area 17 of the hexagonal lattice 21 according to Embodiment 3 will be explained.

The unit pattern area 17 is an area which has a single lattice cell point 16. The unit pattern area 17 is segmented by bisectors M3 (dividing lines) of the line segments linking lattice cell points 16 of two micro lenses 18 adjoining to each other.

As shown in FIG. 11, the unit pattern area 17 with the primitive lattice being a hexagonal lattice 21 takes a form of a regular hexagon. The structure which is configured by adjoining regular hexagons and has no space therebetween, like the basic pattern lens group 15 according to Embodiment 3, is called a honeycomb structure.

An area in which the six unit pattern areas 17 are arranged in the longitudinal direction and the eight in the lateral direction corresponds to the area of the basic pattern lens group 15 of the micro lens array 14 shown in FIG. 10.

Next, explanation will be made on how to randomly arrange the apexes 19 of the micro lenses 18, using as a reference the lattice cell points 16 of the hexagonal lattice 21.

In FIG. 11, an area segmented by a boundary set on the basis of a predetermined distance from the lattice cell point 16 toward the dividing lines M3 of the unit pattern area 17 is determined as a displacement area 22. The displacement area 22 is determined on the basis of the distance (a half of P2) between the lattice cell point 16 of the hexagonal lattice 21 and the dividing line M3 of the unit pattern area 17. To be more specific, a line segment is drawn from the lattice cell point 16 vertically to each of the dividing lines M3. Dividing lines of the displacement area 22 are perpendicular bisectors of the line segments vertically drawn.

The apex 19 of the micro lens 18 is arranged from the lattice cell point 16 to a position different from the lattice cell point 16 in the displacement area 22. Namely, the apexes 19 are moved from the respective lattice cell points 16 by respective different displacement amounts determined in advance, in respective different directions determined in advance. That is, the positions of the apexes 19 of the micro lenses 18 are positions which are randomly displaced from the respective lattice cell points 16 within the displacement area 22.

In FIG. 11, the distance between the lattice cell point 16 of the hexagonal lattice 21 and the dividing line M3 of the unit pattern area 17 is a reference distance S2. Namely, the reference distance S2 is the length of the perpendicular line drawn from the lattice cell point 16 to the dividing line M3 of the unit pattern area 17. Using dotted lines, a hexagon is drawn by lines which pass through points being on the above perpendicular lines and away by a distance of 0.6×S2 from the lattice cell point 16, and run parallel to the dividing lines M3 of the unit pattern area 17. In FIG. 11, the hexagonal area framed by the dotted line segments is the displacement area 22.

Thus, a displacement direction and amount for placing the apex 19 are determined within a range (the displacement area 22) defined by the predetermined distance from the lattice cell point 16. A displacement area 22 smaller than the unit pattern area 17 can prevent the apexes 19 of the mutually adjoining micro lenses 18 from overlapping with each other.

An image display device 100 with the micro lenses 18 according to Embodiment 3 can reduce luminance unevenness of the displayed images.

Here, the displacement amounts of the apexes 19 are given so that the basic pattern lens groups 15 will continuously adjoin each other across the dividing lines B8 to B14. A method for providing such displacement amounts will be explained next, especially, among the micro lenses 18 of the basic pattern lens groups 15, on the apexes 19 of the micro lenses 18 in contact with the dividing lines B8 to B14.

Suppose that, for all the unit pattern areas 17 shown in FIG. 11, the positions of the apexes 19 of the micro lenses 18 are randomly arranged. Here, similarly to Embodiment 1, the dividing lines of the micro lenses 18 can be drawn by generating Voronoi diagram. In this case, however, the dividing lines B8 to B14, segmenting the micro lens array 14, are of a random shape as shown in FIG. 10. Hence, it is difficult to repeatedly arrange the same basic pattern lens groups 15.

To cope with this, in the micro lens array 14 according to Embodiment 3, the layout of the dividing lines B8 to B14 and the positioning of the apexes 19 of the micro lenses 18 are devised in order that the basic pattern lens groups 15 can be repeatedly arranged.

Figure 12:
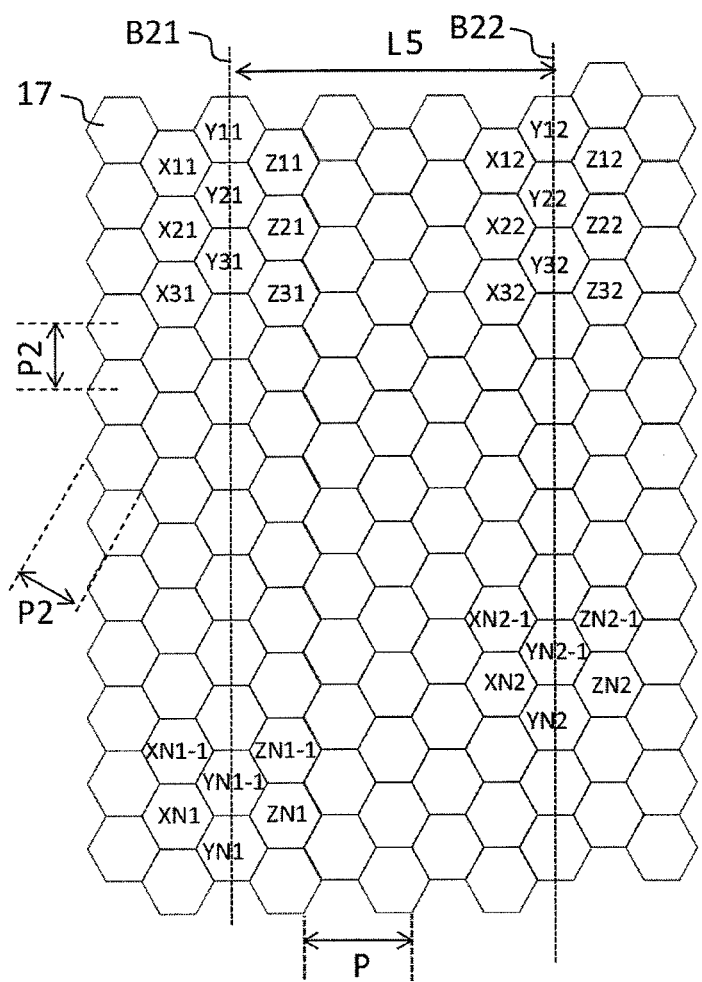
FIG. 12 is a drawing for illustrating a design of the micro lens array according to Embodiment 3 of the present invention.

FIG. 12 is a drawing for explaining how to determine the displacement amounts of the lattice cell points 16 of the micro lenses 18 in contact with the longitudinal (perpendicular) dividing lines B9, B10, B12 and B13. In FIG. 12, longitudinal reference lines B21 and B22 are reference lines for the dividing lines B9, B10, B12 and B13. Here, the longitudinal reference line B21 is called a first longitudinal reference line and the longitudinal reference line B22 is called a second longitudinal reference line.

The longitudinal reference lines B21 and B22 are drawn on the unit pattern areas 17 arranged without space. The lateral distance between the longitudinal reference lines B21 and B22 is the distance (the repetition period) $L_5$. In other words, the distance (the repetition period) $L_5$ is the lateral repetition period of the longitudinal reference lines B21 and B22. Here, the distance (the repetition period) $L_5$ between the longitudinal reference lines B21 and B22 is determined as a period length P multiplied by an integer.

The period length P is the lateral period length for the unit pattern areas 17. In FIG. 12, for example, it is the distance between areas X11 and Z11 which will be explained later. Namely, the period length P is a distance between the two unit pattern areas 17 that are at the same positions in the direction of the longitudinal reference line B21 or B22. In the hexagonal lattice 21, the period length P takes a different value than a period length Q which will be explained later.

First, unit pattern areas 17 on the longitudinal reference lines B21 and B22 will be explained. Each of such unit pattern areas 17 corresponds to a first longitudinal unit pattern area. Here, a same displacement amount in a same direction is given to the unit pattern areas 17 located at positions corresponding to each other on the respective longitudinal reference lines B21 and B22. "Corresponding" means that two unit pattern areas 17 of attention are at the same positions in the longitudinal direction, on the respective longitudinal reference lines B21 and B22. The longitudinal direction is the direction in which the longitudinal reference lines B21 and B22 extend.

In FIG. 12, symbols Y11, Y21, Y31, YN1-1 AND YN1 for example are given to the unit pattern areas 17 on the longitudinal reference line B21. Also, symbols Y12, Y22, Y32, YN2-1 and YN2 for example are given to the unit pattern areas 17 on the longitudinal reference line B22.

Next, explanation will be made on unit pattern areas 17 positioned to the left side of the unit pattern areas 17 on the longitudinal reference lines B21 and B22. Each of these unit pattern areas 17 corresponds to a second longitudinal unit pattern area. A same displacement amount in a same direction is given to unit pattern areas 17 which are among those unit pattern areas 17 and located at positions corresponding to each other.

In FIG. 12, unit pattern areas 17 positioned to the left side of the unit pattern areas 17 on the longitudinal reference line B21 are given, for example, symbols X11, X21, X31, XN1-1 and XN1. Also, unit pattern area 17 positioned to the left side of the unit pattern areas 17 on the longitudinal reference line B22 are given, for example, symbols X12, X22, X32, XN2-1 and XN2.

Next, explanation will be made on unit pattern areas 17 positioned to the right side of the unit pattern areas 17 on the longitudinal reference lines B21 and B22. Each of these unit pattern areas 17 corresponds to a third longitudinal unit pattern area. A same displacement amount in a same direction is given to unit pattern areas 17 that are among those unit pattern areas 17 and located at corresponding positions.

In FIG. 12, unit pattern areas 17 positioned to the right side of the unit pattern areas 17 on the longitudinal reference line B21 are given, for example, symbols Z11, Z21, Z31, ZN1-1 and ZN1. Also, unit pattern area 17 positioned to the right side of the unit pattern areas 17 on the longitudinal reference line B22 are given, for example, symbols Z12, Z22, Z32, ZN2-1 and ZN2.

In FIG. 12, symbols are provided to some of the unit pattern areas 17 to show the positions thereof. Here, for example, a unit pattern area 17 located at the position of X11 is represented as "an area X11" for explanation.

In FIG. 12, among the unit pattern areas 17, the area X11 and the area X12 are at corresponding positions. In the same way, the area X21 and the area X22 are the unit pattern areas 17 positioned at corresponding positions. The area X31 and the area X32 are the unit pattern areas 17 positioned at corresponding positions.

Also, the area Y11 and the area Y12 are the unit pattern areas 17 positioned at corresponding positions. The area Y21 and the area Y22 are the unit pattern areas 17 positioned at corresponding positions. The area Y31 and the area Y32 are the unit pattern areas 17 positioned at corresponding positions.

In the same way, the area Z11 and the area Z12 are the unit pattern areas 17 positioned at corresponding positions. The area Z21 and the area Z22 are the unit pattern areas 17 positioned at corresponding positions. The area Z31 and the area Z32 are the unit pattern areas 17 positioned at corresponding positions.

A same displacement amount in a same direction will be given to lattice cell points 16 of the unit pattern areas 17 positioned at corresponding positions.

A group is formed by the areas X11, X21, X31, Y11, Y21, Y31, Z11, Z21, and Z31 which are positioned in the vicinity of the longitudinal reference line B21. Also, another group is formed by the areas X12, X22, X32, Y12, Y22, Y32, Z12, Z22 and Z32 which are positioned in the vicinity of the longitudinal reference line B22.

Within each of the groups, different displacement directions and different displacement amounts are assigned to the respective lattice cell points 16 of the unit pattern areas 17.

Figure 13:
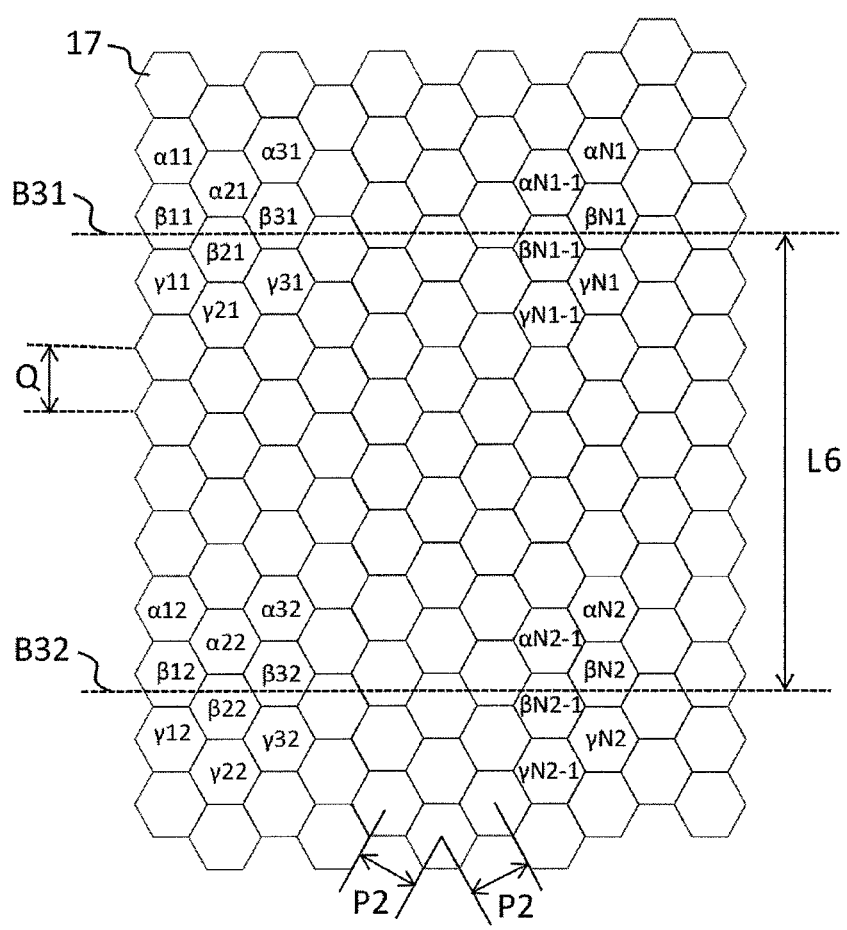
FIG. 13 is also a drawing for illustrating a design of the micro lens array according to Embodiment 3 of the present invention.

FIG. 13 is a drawing used for explaining a method for determining the displacement amounts for the lattice cell points 16 of the micro lenses 18 in contact with the lateral (horizontal) dividing lines B8, B11 and B14. In FIG. 13, lateral reference lines B31 and B32 are the references for the dividing lines B8, B11 and B14. Here, the lateral reference line B31 is called a first lateral reference line and the lateral reference line B32 is called a second reference line.

Note that a first reference line and a second reference line are a combination of lines in the same direction. Namely, they are a combination of longitudinal reference lines or a combination of lateral reference lines.

The lateral reference lines B31 and B32 are drawn on the unit pattern areas 17 arranged without space. The longitudinal distance between the lateral reference lines B31 and B32 is the distance (the repetition period) $L_6$. In other words, the distance (the repetition period) $L_6$ is the longitudinal repetition period of the lateral reference lines B31 and B32. Here, the distance (the repetition period) $L_6$ between the lateral reference lines B31 and B32 will be determined as the period length Q multiplied by an integer.

The period length Q is a longitudinal period length of the unit pattern areas 17. In FIG. 13, for example, it is the distance between areas α11 and β11, which will be explained later. Namely, it is the distance between the two unit pattern areas 17 arranged in the same positions in the direction of the lateral reference lines B31 and B32.

First, unit pattern areas 17 on the lateral reference lines B31 and B32 will be explained. Each of such unit pattern areas 17 corresponds to a first lateral unit pattern area. Here, a same displacement amount in a same direction is given to the unit pattern areas 17 located at positions corresponding to each other on the respective lateral reference lines B31 and B32. "Corresponding" means that the unit pattern areas 17 of attention are at the same positions in the lateral direction, on the respective lateral reference lines B31 and B32. The lateral direction is the direction in which the lateral reference lines B31 and B32 extend.

In FIG. 13, symbols β11, β21, β31, βN1-1 and βN1 for example are given to the unit pattern areas 17 on the lateral referenceline B31. Also, symbols β12, β22, β32, βN2-1 and βN2 for example are given to the unit pattern area 17 on the lateral reference line B32.

Next, explanation will be made on unit pattern areas 17 positioned to the upper side of the unit pattern areas 17 on the lateral reference lines B31 and B32. Each of these unit pattern areas 17 corresponds to a second lateral unit pattern area. A same displacement amount in a same direction is given to the unit pattern areas 17 which are among those unit pattern areas 17 and located at positions corresponding to each other.

In FIG. 13, unit pattern areas 17 positioned to the upper side of the unit pattern areas 17 on the lateral reference line B31 are given, for example, symbols α11, α21, α31, αN1-1 and αN1. Also, unit pattern areas 17 positioned to the upper side of the unit pattern areas 17 on the lateral reference line B32 are given, for example, symbols α12, α22, α32, αN2-1 and αN2.

Next, explanation will be made on unit pattern areas 17 positioned to the lower side of the unit pattern areas 17 on the lateral reference line B31 and B32. Each of these unit pattern areas 17 corresponds to a third lateral unit pattern area. A same displacement amount in a same direction is given to unit pattern areas 17 that are among those unit pattern areas 17 and located at corresponding positions.

In FIG. 13, unit pattern areas 17 positioned to the lower side of the unit pattern areas 17 on the lateral reference line B31 are given, for example, symbols γ11, γ21, γ31, γN1-1 and γN1. Also, unit pattern areas 17 positioned to the lower side of the unit pattern areas 17 on the lateral reference line B32 are given, for example, symbols γ12, γ22, γ32, γN2-1 and γN2.

In making a combination of unit pattern areas, note that the unit pattern areas arranged in the same direction are to be combined. To be more specific, the unit pattern areas 17 adjoining to each other in the longitudinal direction are to be combined and the unit pattern areas 17 adjoining to each other in the lateral direction are to be combined.

In FIG. 13, symbols are provided to some of the unit pattern areas 17 to show the positions thereof. Here, for example, a unit pattern area 17 located at the position of α11 is represented as "an area α11" for explanation.

In FIG. 13, among the unit pattern areas 17, the area α11 and the area α12 are at corresponding positions. In the same way, the area α21 and the area α22 are the unit pattern areas 17 positioned at corresponding positions. The area α31 and the area α32 are the unit pattern areas 17 positioned at corresponding positions.

Also, the area β11 and the β12 are the unit pattern areas 17 positioned at corresponding positions. The area β21 and the area β22 are the unit pattern areas 17 positioned at corresponding positions. The area β31 and the area β32 are the unit pattern areas 17 positioned at corresponding positions.

In the same way, the area γ11 and the area γ12 are the unit pattern areas 17 positioned at corresponding positions. The area γ21 and the area γ22 are the unit pattern areas 17 positioned at corresponding positions. The area γ31 and the area γ32 are the unit pattern areas 17 positioned at corresponding positions.

A same displacement amount in a same direction will be given to lattice cell points 16 of the unit pattern areas 17 positioned at corresponding positions.

A group is formed by the areas α11, α21, α31, β11, β21, β31, γ11, γ21 and γ31 which are positioned in the vicinity of the lateral reference line B31. Also, another group is formed by the areas α12, α22, α32, β12, β22, β32, γ12, γ22 and γ32 which are positioned in the vicinity of the lateral reference line B32.

Within each of the groups, different displacement directions and different displacement amounts are assigned to the respective lattice cell points 16 of the unit pattern areas 17.

Figure 14:
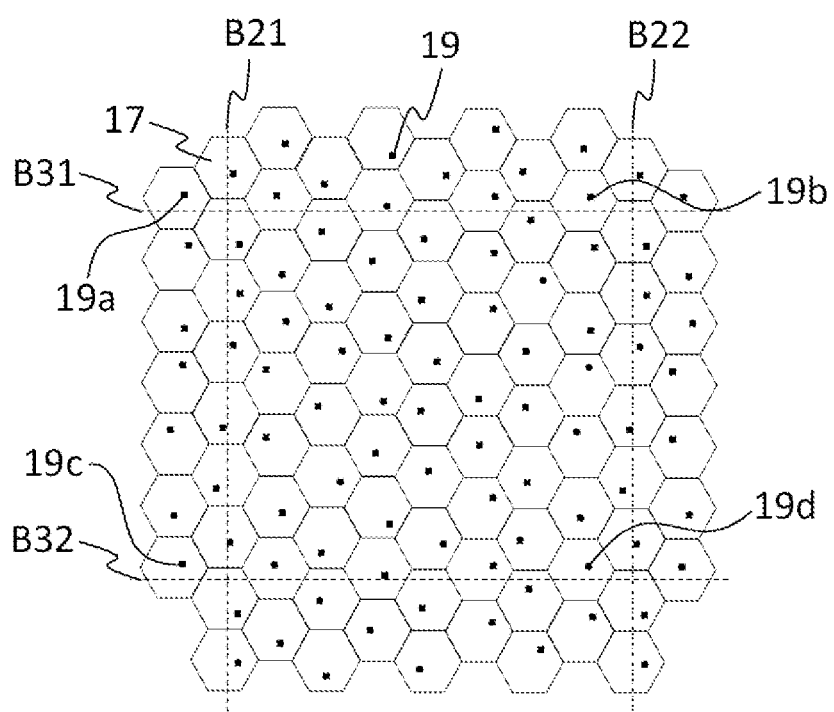
FIG. 14 is a drawing illustrating positions of apexes of the micro lenses included in the micro lens array according to Embodiment 3 of the present invention.

FIG. 14 is a drawing illustrating that the positions of the apexes 19 of the micro lenses 18 are randomly arranged according to the above explained method, in the unit pattern areas 17 arranged with no space therebetween.

In FIG. 14, black dots indicate the positions of the apexes 19 of the micro lenses 18. In the unit pattern areas 17 arranged at the corresponding positions between the longitudinal reference lines B21 and B22, as well as between the lateral reference lines B31 and B32, a same displacement amount in a same direction is given to the positions of the apexes 19 of the micro lenses 18.

For example, the apexes 19a, 19b, 19c and 19d are positioned at a same position in the respective unit pattern areas 17.

The apex 19a is the apex 19 of the unit pattern area 17 which is positioned to the left side of the longitudinal reference line B21 and to the upper side of the lateral reference line B31. The apex 19b is the apex 19 of the unit pattern area 17 which is positioned to the left side of the longitudinal reference line B22 and to the upper side of the lateral reference line B31. The apex 19c is the apex 19 of the unit pattern area 17 which is positioned to the left side of the longitudinal reference line B21 and to the upper side of the lateral reference line B32. The apex 19d is the apex 19 of the unit pattern area 17 which is positioned to the left side of the longitudinal reference line B22 and to the upper side of the lateral reference line B32.

As explained in FIG. 12 and FIG. 13, the distances (the repetition period) $L_5$ and $L_6$ which are the distance between the longitudinal reference lines B21 and B22 and the distance between lateral reference lines B31 and B32 respectively, are selectable. By selecting the distances (the repetition period) $L_5$ and $L_6$, the size of the basic pattern lens group 15 can be freely selected.

FIG. 12 and FIG. 13 shows a case where the reference lines B21, B22, B31 and B32 are drawn in the longitudinal and the lateral directions. By using the same method, however, the hexagonal lattice 21 can be formed in an oblique direction. Further, various types of polygons can be used for the reference lines to develop a repetition structure of random arrangements. Instead of straight lines, curved lines can be used as the reference lines.

The dividing lines B8 to B14 of the multiple micro lenses 18 are determined on the basis of the positions of the apexes 19 of the unit pattern areas 17 shown in FIG. 14. Then, the micro lens array 14 shown in FIG. 10 which includes the basic pattern lens groups 15 can be obtained.

The determination method of the dividing lines B8 to B14 of the basic pattern lens groups 15 is the same as explained in Embodiment 1.

The randomly positioned multiple apexes 19 of the micro lenses 18 are used as the seeds. A straight line is drawn which internally divides, by a certain ratio, the line segment linking two seeds (the apexes 19) of the adjoining micro lenses 18. This straight line is a dividing line M4 of the micro lens 18. The dividing lines M4 shown in FIG. 10 can be obtained by drawing Voronoi diagram which uses these straight lines as dividing lines. Here, the dividing lines M4 correspond to the third dividing line. In other words, the dividing lines of the micro lenses 18 are the third dividing line.

Each of the dividing lines B8 to B14 shown in FIG. 10 is a series of the dividing lines M4 which are positioned on the boundary of the basic pattern lens groups 15, to be connected to each other.

For example, the longitudinal dividing lines B9, B10, B12 and B13 of the unit pattern lens groups 15 according to Embodiment 3 may be obtained by for example, connecting the dividing lines M4 between the micro lenses 18 corresponding to the first longitudinal unit pattern areas and the micro lenses 18 corresponding to the second longitudinal unit pattern areas.

In the same way, the longitudinal dividing lines B9, B10, B12 and B13 may be obtained by connecting the dividing lines M4 between the micro lenses 18 corresponding to the first longitudinal unit pattern areas and the micro lenses 18 corresponding to the third longitudinal unit pattern areas.

The first longitudinal unit pattern areas are the areas Y11, Y21, Y31, Y12, Y22 and Y32. The second longitudinal unit pattern areas are the areas X11, X21, X31, X12, X22 and X32. The third longitudinal unit pattern areas are the areas Z11, Z21, Z31, Z12, Z22 and Z32.

In the same way, for example, the lateral dividing lines B8, B11 and B14 of the unit pattern lens group 15 according to Embodiment 3 can be obtained by, for example, connecting the dividing lines M4 between the micro lenses 18 corresponding to the first lateral unit pattern areas and the micro lenses 18 corresponding to the second lateral unit pattern areas.

The lateral dividing lines B8, B11 and B14 can be obtained by connecting the dividing lines M4 between the micro lenses 18 corresponding to the first lateral unit pattern areas and the micro lenses 18 corresponding to the third lateral unit pattern areas.

The first lateral unit pattern areas are the areas β11, β21, β31, β12, β22 and β32. The second lateral unit pattern areas are the areas α11, α21, α31, α12, α22 and α32. The third lateral unit pattern areas are the areas γ11, γ21, γ31, γ12, γ22 and γ32.

Similarly to Embodiment 1, the micro lens array 14 according to Embodiment 3 of the present invention can be used for the screen 140 of the image display device 100 shown in FIG. 4. Also in the basic pattern lens groups 15 of the micro lens array 14, the apexes 19 of the micro lenses 18 are randomly positioned. Because the basic pattern lens groups 15 are repeatedly arranged, lenses with a same shape exists, similarly to Embodiment 1, at the corresponding positions in the respective adjoining periodic structures. Here, "the periodic structure" means the basic pattern lens group Therefore, the diffracted beams are produced from the periodic structure based on the lateral repetition period $L_5$ and the longitudinal repetition period $L_6$ included in the basic pattern lens groups 15.

In Embodiment 3 too, as is the case with Embodiment 1, it is desirable to determine the repetition periods $L_5$ and $L_6$ [mm] so that the angle $\theta_{out}$ [rad] will be smaller than $V_{min}$, the visual angle limit of the driver's eye 170. Here, the angle $\theta_{out}$ [rad] is the angle to the optical axis C for the first-order diffracted beam $Gd_1$, to enter the driver's eye 170. The visual angle, represented as $a^{-1}$[']$(min)$, is the inverse of the eyesight a.

As already explained in Embodiment 1, the calculation method for the repetition period L[mm] to make the angle $\theta_{out}$ [rad] less than $V_{min}$, or the visual angle limit of the driver's eye 170, will be omitted.

The primitive lattice of the micro lens array 14 according to Embodiment 3 is the hexagonal lattice 21. The first longitudinal reference line B21 and the second longitudinal reference line B22 are set over the hexagonal lattice 21. The second longitudinal reference line B22 is arranged oppositely to the first longitudinal reference line B21. Both the first longitudinal reference line B21 and the second longitudinal reference line B22 are set over the hexagonal lattice 21.

In the first longitudinal unit pattern areas 17 that each exist at corresponding positions with respect to the first longitudinal reference line B21 and the second longitudinal reference line B22, the displacement amounts and directions from the respective lattice cell points 16 are the same. Moreover, in the second longitudinal unit pattern areas 17, the displacement amounts and directions from the respective lattice cell points 16 are the same. Furthermore, in the third longitudinal unit pattern areas 17, the displacement amounts and directions from the respective lattice cell points 16 are the same.

The second longitudinal unit pattern areas 17 are areas positioned in one side of the first longitudinal unit pattern areas 17. The third longitudinal unit pattern areas 17 are areas positioned in the other side of the first longitudinal unit pattern areas 17. In Embodiment 3, "one side" is the left side and "the other side" is the right side.

The third dividing line M4 includes the bisector of the line segment linking the apexes 19 of the adjoining micro lenses 18. In this case, each of the first dividing lines B9, B10, B12 and B13 includes third dividing lines M4 provided to the micro lenses 18 positioned in the first longitudinal unit pattern areas 17. The third dividing lines M4 are dividing lines of the micro lenses 18.

The primitive lattice of the micro lens array 14 according to Embodiment 3 is the hexagonal lattice 21. The first lateral reference line B31 and the second lateral reference line B32 are set over the hexagonal lattice 21. The second lateral reference line B32 is positioned oppositely to the first lateral reference line B31. Both the first lateral reference line B31 and the second lateral reference line B32 are set over the hexagonal lattice 21.

In the first lateral unit pattern areas 17 that each exist at corresponding positions with respect to the first lateral reference line B31 and the second lateral reference line B32, the displacement amounts and directions from the respective lattice cell points 16 are the same. Moreover, in the second lateral unit pattern areas 17, the displacement amounts and directions from the respective lattice cell points 16 are the same. Furthermore, in the third lateral unit pattern areas 17, the displacement amounts and directions from the respective lattice cell points 16 are the same.

The second lateral unit pattern areas 17 are areas positioned in one side of the first lateral unit pattern areas 17. The third lateral unit pattern areas 17 are areas positioned in the other side of the first lateral unit pattern areas 17. In Embodiment 3, "one side" is the upper side and "the other side" is the lower side.

The third dividing line M4 is a portion of the bisector of the line segment linking the apexes 19 of the adjoining micro lenses 18. In this case, each of the first dividing lines B8, B11 and B14 is a series of the third dividing lines M4 provided to the micro lenses 18 positioned in the first lateral unit pattern areas 17. The third dividing lines M4 are dividing lines of the micro lenses 18.

As the result, the randomness in positioning the apexes 19 of the micro lenses 18 in contact with the first dividing lines B8 to B14 can be further improved. Also, the visibility of the displayed image for drivers can be further improved than in the case where the first dividing lines B8 to B14 between the basic pattern lens groups 15 are single straight lines as are the first dividing lines B1 to B7 shown in FIG. 1. Further, repetitive arrangement of the same basic pattern lens groups 15 becomes possible.

Usage of the micro lens array 14 according to Embodiment 3 for the image display device 100 further improves the visibility of the displayed image for drivers.

Embodiment 4

A micro lens array 29 according to Embodiment 4 includes basic pattern lens groups 30, 31 and 32 which are different from each other. The positioning randomnesses of the apexes 4 and 19 in the micro lenses 3 and 18 are different between the basic pattern lens groups 30, 31 and 32.

Figure 15:
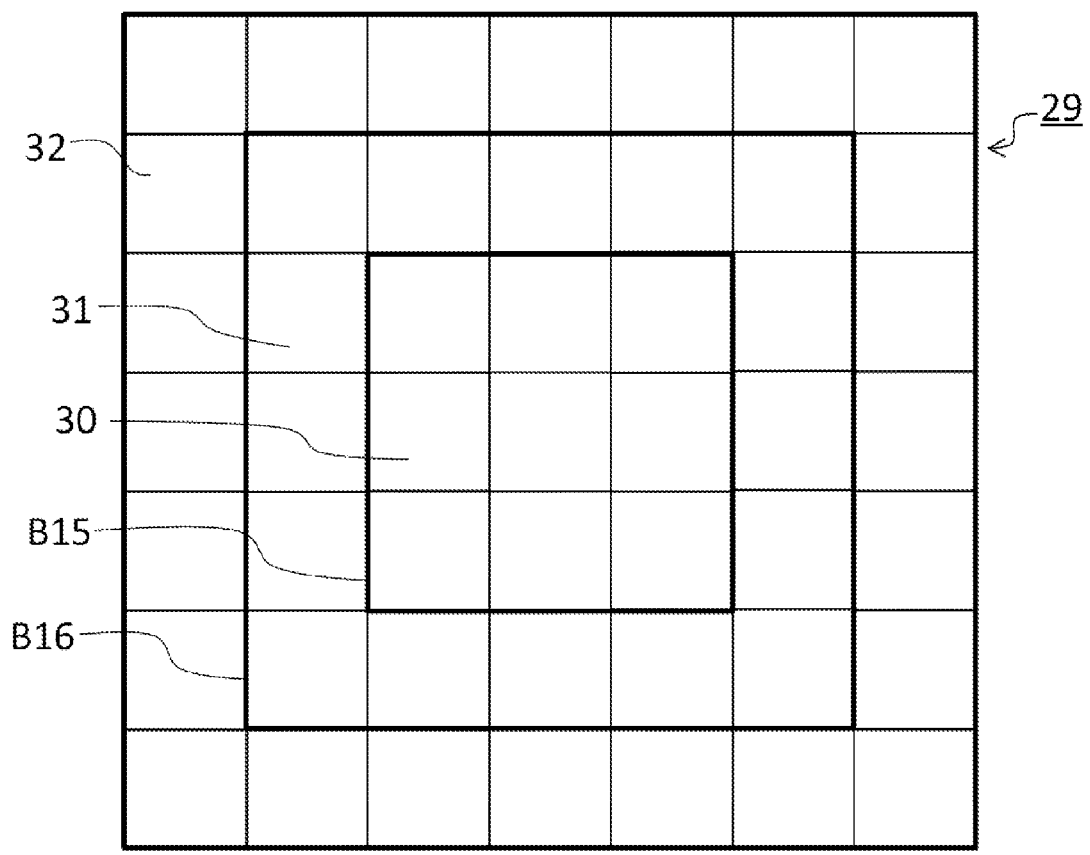
FIG. 15 is a drawing illustrating arrangement of basic pattern lens groups different from each other in a micro lens array according to Embodiment 4 of the present invention.

FIG. 15 is a drawing illustrating a configuration of the micro lens array 29.

The basic pattern lens groups 30 are arranged in the center area of the micro lens array 29. In FIG. 15, three basic pattern lens groups 30 are arranged in the lateral direction and also three in the longitudinal direction. Namely, in the center area of the micro lens array 29 arranged are nine basic pattern lens groups 30.

The basic pattern lens groups 31 are arranged around the area of the basic pattern lens groups 30. The basic pattern lens groups 31 are arranged in a single line so as to surround the area of the basic pattern lens groups 30. Outermost basic pattern lens groups 30 in the area of the basic pattern lens groups 30 and the basic pattern lens groups 31 adjoin each other. Sixteen basic pattern lens groups 31 are arranged as shown in FIG. 15.

Moreover, the basic pattern lens groups 32 are arranged around the area of the basic pattern lens groups 31. The basic pattern lens groups 32 are arranged in a single line so as to surround the basic pattern lens groups 31. The basic pattern lens groups 31 and the basic pattern lens groups 32 adjoin each other. Twenty-four basic pattern lens groups 32 are arranged in FIG. 15.

Here, positioning randomness of the apexes 4 and 19 of the micro lenses 3, 18 is different between the areas of the basic pattern lens groups 30, 31 and 32. Despite different randomness in the basic pattern lens groups 30, 31 and 32, the dividing lines therebetween are designed so that the basic pattern lens groups 30, 31 and 32 can adjoin each other.

In FIG. 15, the shape of a dividing line B15 which forms the outer perimeter of the area of the basic pattern lens groups 30 as well as the inner perimeter of the area of the basic pattern lens groups 31 is designed to be adjoinable. Also, the shape of a dividing line B16 which forms the outer perimeter of the area of the basic pattern lens groups 31 as well as the inner perimeter of the area of the basic pattern lens groups 32 is designed to be adjoinable.

The micro lenses 3 and 18 in contact with the dividing lines B15 and B16, have same randomness between the basic pattern lens groups 30 and the basic pattern lens groups 31, and same randomness between the basic pattern lens groups 31 and the basic pattern lens groups 32.

In this way, the basic pattern lens groups 30, 31 and 32 having different randomness can be adjoiningly arranged.

Note, however, that the same type of groups among the basic pattern lens groups 30, 31, and 32 have the same randomness.

FIG. 15 shows the micro lens array 29 in which the three basic pattern lens groups 30, 31 and 32, of the different randomness from each other, are arranged. According to Embodiment 4, these different basic pattern lens groups 30, 31 and 32 are repeatedly arranged. Also, these different basic pattern lens groups 30, 31 and 32 are arranged so as to adjoin each other. According to Embodiment 4, the basic pattern lens groups 30, 31 and 32 with different randomness are not limited to those types.

FIG. 15 shows the case in which the basic pattern lens groups 30, 31 and 32 with different randomness are arranged in order from central portion to the periphery of the micro lens array 29. However, the basic pattern lens groups 30, 31 and 32 with different randomness may be arranged in whatever orders.

Further, in the micro lens array 29, the micro lenses 3 included in the basic pattern lens groups 30, 31 and 32 are designed so as to have respective different diffusion angles θ (the divergence angles). These diffusion angles θ depend on the lens surface curvature of the micro lens array 29. The light utilization efficiency can be further improved by using a screen 140 provided with the micro lens array 29 for the image display device 100.

FIG. 16(A) and FIG. 16(B) diagrams illustrating the relation between diffusion angles θ of beams emerging from the micro lens array 29 and the eye box E.

Here, "the eye box" is an area in which a full view of the displayed image projected onto the windshield 160 by the image display device 100 is provided even if the driver's eye 170 moves. More specifically, as shown in FIG. 16, the eye box is the area in which the diffusion angles θ of the micro lenses 3 at all positions on the micro lens array 29 overlap.

FIG. 16(A) is a diagram illustrating the beams entering the eye box E. Here, the diffusion angles θ of the respective micro lenses 3 included in the basic pattern lens groups 30, 31 and 32 with different randomness, are the same. More specifically, in FIG. 16(A), all the diffusion angles θ of the micro lenses 3 of the basic pattern lens groups 30, 31 and 32 shown in FIG. 15 are a same angle θ1.

FIG. 16(B) is a diagram illustrating the beams entering the eye box E. Here, the diffusion angles θ of the micro lenses 3 included in the basic pattern lens groups 30, 31 and 32 with different randomness are each different between the basic pattern lens groups 30, 31 and 32. More specifically, in FIG. 16(B), the diffusion angles θ of the micro lenses 3 in the basic pattern lens groups 30, the basic pattern lens groups 31 and the basic pattern lens groups 32 shown in FIG. 15, are set to the angle θ3, the angle θ2 and the angle θ1, respectively.

The diffusion angle θ of the basic pattern lens groups 30 is θ3. The diffusion angle θ of the basic pattern lens groups 31 is θ2. The diffusion angle θ of the basic pattern lens groups 32 is θ1.

Here, the angles θ3, θ2 and θ1 satisfy a relation of θ3<θ2<θ1. Namely, the diffusion angles θ of the micro lenses 3 are designed so as to become reduced in size in order from the periphery to central portion. For example, the diffusion angle θ of the micro lenses 3 in the basic pattern lens groups 32 arranged in the periphery of the micro lens array 29 is larger than the diffusion angle θ3 of the micro lens 3 in the basic pattern lens groups 30 arranged in central portion of the micro lens array 29.

As shown in FIG. 16(B), the micro lenses 3 of the basic pattern lens groups 30, 31 and 32 are designed so that the diffusion angles θ1, θ2 and θ3 will satisfy the relation of θ3<θ2<θ1.

From the FIG. 16, it will be understood that the light utilization efficiency can be improved without changing the size of the eye box E. In other words, the beam amount entering the eye box can be increased than in a case of θ3=θ2=θ1, by designing the diffusion angles θ1, θ2 and θ3 of the micro lenses 3 of the basic pattern lens groups 30, 31 and 32 so as to satisfy the relation θ3<θ2<θ1.

It is because the amount of beams emerging from the basic pattern lens groups 30 and 31 to enter the eye box E is larger in the micro lens array 29 shown in FIG. 16B than in the micro lens array 29 shown in FIG. 16A.

In FIG. 16, it has been explained that the basic pattern lens groups 30, 31 and 32 have randomnesses different from each other. It may be possible to adjust only the diffusion angles θ to be different, while making the randomnesses be the same.

The micro lens array 29 according to Embodiment 4 includes the multiple different basic pattern lens groups 30, 31 and 32. The apexes 4 of the micro lenses 3 are arranged to different positions according to respective different basic patterns of the lens groups 30, 31 and 32. Thus, the positioning randomness of the apexes 4 of the micro lenses 3 included in the micro lens array 29 is further improved, thereby achieving higher visibility of the displayed image.

According to the micro lens array 29 in Embodiment 4, in the multiple different basic pattern lens groups 30, 31 and 32, the diffusion angles θ of the micro lenses 3 are designed so as to become reduced in size in order from the periphery to central portion. Namely, the diffusion angle θ1 of the micro lenses 3 in the basic pattern lens groups 32 arranged in the periphery of the micro lens array 29 is larger than the diffusion angle θ3 of the micro lenses 3 in the basic pattern lens groups 30 arranged in the central portion of the micro lens array 29. Thus, the light utilization efficiency can be improved without changing the area of the eye box E.

By using the micro lens array 29 according to Embodiment 4 for the screen 140 of the image display device 100, the light utilization efficiency can be improved without changing the size of the eye box E.

So far, explanation has been made about the embodiments according to the present invention. The present invention is not limited to the scope of the embodiments. Within the scope of the invention, the embodiments can be freely combined, appropriately changed and/or omitted.

DESCRIPTION OF SYMBOLS 1, 14, 29: micro lens array
2, 2b, 2s, 15, 15s, 30, 31, 32: basic pattern lens group
3, 18: micro lens
4, 19: apex
10: square lattice
21: hexagonal lattice
11, 16: lattice cell point
12, 17: unit pattern area
13, 22: displacement area
100: image display device
111, 112, 113: semiconductor laser
117, 118: beam-combining prism
114, 115, 116: coupling lens
110: light source unit
120: mirror
130: MEMS mirror device (scanning unit)
130a: mirror
130b: driving unit
130c: mirror's pivot center
140: screen
150: magnifying mirror
155: optical element unit (optical system)
160: windshield
170: driver's eye
170a: retina (imaging surface)
180: virtual image
B1 to B16: dividing line
B21, B22: longitudinal reference line
M, M1, M2, M3, M4: dividing line
$L_1$, $L_2$: length L: repetition period
$\theta_{out}$, $\theta_{in}$, $\theta_0$, $\theta_M$: angle
θ: diffusion angle
S1: reference distance
Sv: height
P, Q: period length
P1, P2: distance
$L_1$, $L_2$: Length
Lb: interval between bright spots
Bp: bright spot
E: eye box
$E_0$: eye box center
C: optical axis
D, $D_0$, $D_1$, $D_{21}$, $D_{22}$: distance
Dv: distance
$G_0$, $G_1$, G: ray G
$Gd_0$, $Gd_1$: diffracted beam
$Pd_0$, $Pd_1$: focal point
$r_{out}$: height
f: focus

The invention claimed is:

1. An image display device to allow an image to be visible from within an area of an eye box, the device comprising:
a light source to emit a beam;
a screen including a micro lens array formed by arranging multiple micro lenses, and
a scanner that includes a first mirror to reflect the beam emitted from the light source and that scans the beam to generate the image on the screen by swinging the first mirror,
wherein, in an optical path to direct the image on the screen to the eye box, an angle formed between a zero-order diffracted beam passing through the eye box center and a first-order diffracted beam passing through the eye box center, which are among a luminous flux of beams diffracted by the screen, is smaller than a minimum visual angle.

2. The image display device according to claim 1, wherein the micro lens array is formed by repeatedly arranging a basic pattern lens group that is an area in which apexes of the micro lenses are randomly arranged.

3. The image display device according to claim 2, further comprising a second mirror to direct the image on the screen to the eye box,
wherein,
under the following definitions:
a wavelength of the beam emitted from the light source being λ;
an angle formed between a beam that enters the screen and corresponds to the zero-order diffracted beam to pass through the eye box center, and a beam that enters the screen and corresponds to the first-order diffracted beam to pass through the eye box center being $\theta_0$;
a diffracted angle of the first-order diffracted beam from the micro lens array being $\theta_{in}$;
a distance between the second mirror and the eye box being $D_2$;
a focal distance of the second mirror being f; and
a human eyesight being a,
within a range of $$\theta_{in} < \frac{f - D_2}{f} \cdot \frac{1}{a} \cdot \frac{1}{60} \cdot \frac{2\pi}{360} [\text{rad}],$$

a repetition period L of the basic pattern lens groups that is an interval between micro lenses arranged at corresponding positions in adjoining basic pattern lens groups satisfies an expression of $$L > \left| \frac{\lambda}{\sin\theta_{in} + \sin\theta_0} \right| [\text{mm}].$$

4. The image display device according to claim 3, wherein the repetition period of the basic pattern lens groups is larger than 0.36 mm.

5. The image display device according to claim 3, wherein the basic pattern lens groups are based on a primitive lattice which is a square lattice, and the apexes are randomly positioned;
the primitive lattice includes lattice cells comprising lattice cell points at their centers;
each of dividing lines between the adjoining basic pattern lens groups includes a straight line; and
apexes of multiple micro lenses adjoining to each other across the straight line in common are positioned line-symmetrically with respect to the shared straight line and are displaced to positions along straight lines passing through the lattice cell points parallelly to the shared straight line.

6. The image display device according to claim 5, wherein in the basic pattern lens groups, on the basis of a hexagonal primitive lattice, the apexes are randomly arranged with their displacement directions and amounts from respective lattice cell points being varied;
the primitive lattice includes the lattice cell points at centers of respective lattice cells;
a first reference line and a second reference line opposed to the first reference line are set over the hexagonal lattice;
the displacement directions and amounts are the same in first unit pattern areas that are positioned at corresponding positions on the first reference line and the second reference line;
the displacement directions and amounts are the same in second unit pattern areas that are positioned in a first side of a perpendicular direction to the first reference line, and in the first side of a perpendicular direction to the second reference line;
the displacement directions and amounts are the same in third unit pattern areas that are positioned in a second side of the perpendicular direction to the first reference line, and in the second side of the perpendicular direction to the second reference line; and
a dividing line between the adjoining basic pattern lens groups is set either to a boundary between each of the first unit pattern areas and each of the second unit pattern areas, or to a boundary between each of the first unit pattern areas and each of the third unit pattern areas.

7. The image display device according to claim 5, wherein the screen includes multiple basic pattern lens groups that have different degrees in apex-positioning-randomness, or multiple basic pattern lens groups that have different diffusion angles in the micro lenses.

8. The image display device according to claim 3, wherein in the basic pattern lens groups, on the basis of a hexagonal primitive lattice, the apexes are randomly arranged with their displacement directions and amounts from respective lattice cell points being varied;

the primitive lattice includes the lattice cell points at centers of respective lattice cells;

a first reference line and a second reference line opposed to the first reference line are set over the hexagonal lattice;

the displacement directions and amounts are the same in first unit pattern areas that are positioned at corresponding positions on the first reference line and the second reference line;

the displacement directions and amounts are the same in second unit pattern areas that are positioned in a first side of a perpendicular direction to the first reference line, and in the first side of a perpendicular direction to the second reference line;

the displacement directions and amounts are the same in third unit pattern areas that are positioned in a second side of the perpendicular direction to the first reference line, and in the second side of the perpendicular direction to the second reference line; and a dividing line between the adjoining basic pattern lens groups is set either to a boundary between each of the first unit pattern areas and each of the second unit pattern areas, or to a boundary between each of the first unit pattern areas and each of the third unit pattern areas.

9. The image display device according to claim 3, wherein the screen includes multiple basic pattern lens groups that have different degrees in apex-positioning-randomness, or multiple basic pattern lens groups that have different diffusion angles in the micro lenses.

10. The image display device according to claim 2, further comprising an optical system to direct the image on the screen to the eye box, wherein, under the following definitions:

a wavelength of the beam emitted from the light source being $\lambda$;

an angle formed between a beam that enters the screen and corresponds to the zero-order diffracted beam to pass through the eye box center, and a beam that enters the screen and corresponds to the first-order diffracted beam to pass through the eye box center being $\theta_0$;

a diffracted angle of the first-order diffracted beam from the micro lens array being $\theta_{in}$;

a distance between the optical system and the eye box being $D_2$;

a focal distance of the optical system being f; and a human eyesight being a, within a range of $$\theta_{in} < \frac{f - D_2}{f} \cdot \frac{1}{a} \cdot \frac{1}{60} \cdot \frac{2\pi}{360} [\text{rad}],$$

a repetition period L of the basic pattern lens groups that is an interval between micro lenses arranged at corresponding positions in adjoining basic pattern lens groups satisfies an expression of $$L > \left| \frac{\lambda}{\sin\theta_{in} + \sin\theta_0} \right| [\text{mm}].$$

11. The image display device according to claim 10, wherein the repetition period of the basic pattern lens groups is larger than 0.36 mm.

12. The image display device according to claim 10, wherein the basic pattern lens groups are based on a primitive lattice which is a square lattice, and the apexes are randomly positioned;

the primitive lattice includes lattice cells comprising lattice cell points at their centers;

each of dividing lines between the adjoining basic pattern lens groups includes a straight line; and apexes of multiple micro lenses adjoining to each other across the straight line in common are positioned line-symmetrically with respect to the shared straight line and are displaced to positions along straight lines passing through the lattice cell points parallelly to the shared straight line.

13. The image display device according to claim 12, wherein in the basic pattern lens groups, on the basis of a hexagonal primitive lattice, the apexes are randomly arranged with their displacement directions and amounts from respective lattice cell points being varied;

the primitive lattice includes the lattice cell points at centers of respective lattice cells;

a first reference line and a second reference line opposed to the first reference line are set over the hexagonal lattice;

the displacement directions and amounts are the same in first unit pattern areas that are positioned at corresponding positions on the first reference line and the second reference line;

the displacement directions and amounts are the same in second unit pattern areas that are positioned in a first side of a perpendicular direction to the first reference line, and in the first side of a perpendicular direction to the second reference line;

the displacement directions and amounts are the same in third unit pattern areas that are positioned in a second side of the perpendicular direction to the first reference line, and in the second side of the perpendicular direction to the second reference line; and a dividing line between the adjoining basic pattern lens groups is set either to a boundary between each of the first unit pattern areas and each of the second unit pattern areas, or to a boundary between each of the first unit pattern areas and each of the third unit pattern areas.

14. The image display device according to claim 12, wherein the screen includes multiple basic pattern lens groups that have different degrees in apex-positioning-randomness, or multiple basic pattern lens groups that have different diffusion angles in the micro lenses.

15. The image display device according to claim 10, wherein in the basic pattern lens groups, on the basis of a hexagonal primitive lattice, the apexes are randomly arranged with their displacement directions and amounts from respective lattice cell points being varied;

the primitive lattice includes the lattice cell points at centers of respective lattice cells;

a first reference line and a second reference line opposed to the first reference line are set over the hexagonal lattice;

the displacement directions and amounts are the same in first unit pattern areas that are positioned at corresponding positions on the first reference line and the second reference line;

the displacement directions and amounts are the same in second unit pattern areas that are positioned in a first side of a perpendicular direction to the first reference line, and in the first side of a perpendicular direction to the second reference line;

the displacement directions and amounts are the same in third unit pattern areas that are positioned in a second side of the perpendicular direction to the first reference line, and in the second side of the perpendicular direction to the second reference line; and a dividing line between the adjoining basic pattern lens groups is set either to a boundary between each of the first unit pattern areas and each of the second unit pattern areas, or to a boundary between each of the first unit pattern areas and each of the third unit pattern areas.

16. The image display device according to claim 10, wherein the screen includes multiple basic pattern lens groups that have different degrees in apex-positioning-randomness, or multiple basic pattern lens groups that have different diffusion angles in the micro lenses.

17. The image display device according to claim 2, wherein the repetition period of the basic pattern lens groups is larger than 0.36 mm.

18. The image display device according to claim 2, wherein the basic pattern lens groups are based on a primitive lattice which is a square lattice, and the apexes are randomly positioned;

the primitive lattice includes lattice cells comprising lattice cell points at their centers;

each of dividing lines between the adjoining basic pattern lens groups includes a straight line; and apexes of multiple micro lenses adjoining to each other across the straight line in common are positioned line-symmetrically with respect to the shared straight line and are displaced to positions along straight lines passing through the lattice cell points parallelly to the shared straight line.

19. The image display device according to claim 2, wherein in the basic pattern lens groups, on the basis of a hexagonal primitive lattice, the apexes are randomly arranged with their displacement directions and amounts from respective lattice cell points being varied;

the primitive lattice includes the lattice cell points at centers of respective lattice cells;

a first reference line and a second reference line opposed to the first reference line are set over the hexagonal lattice;

the displacement directions and amounts are the same in first unit pattern areas that are positioned at corresponding positions on the first reference line and the second reference line;

the displacement directions and amounts are the same in second unit pattern areas that are positioned in a first side of a perpendicular direction to the first reference line, and in the first side of a perpendicular direction to the second reference line;

the displacement directions and amounts are the same in third unit pattern areas that are positioned in a second side of the perpendicular direction to the first reference line, and in the second side of the perpendicular direction to the second reference line; and a dividing line between the adjoining basic pattern lens groups is set either to a boundary between each of the first unit pattern areas and each of the second unit pattern areas, or to a boundary between each of the first unit pattern areas and each of the third unit pattern areas.

20. The image display device according to claim 2, wherein the screen includes multiple basic pattern lens groups that have different degrees in apex-positioning-randomness, or multiple basic pattern lens groups that have different diffusion angles in the micro lenses.

* * * * *